United States Patent [19]

Stiegler

[11] Patent Number: 5,774,121
[45] Date of Patent: Jun. 30, 1998

[54] USER INTERFACE METHOD AND SYSTEM FOR GRAPHICAL DECISION MAKING WITH CATEGORIZATION ACROSS MULTIPLE CRITERIA

[75] Inventor: Marc D. Stiegler, Kingman, Ariz.

[73] Assignee: Avantos Performance Systems, Inc., Emeryville, Calif.

[21] Appl. No.: 531,151

[22] Filed: Sep. 18, 1995

[51] Int. Cl.$^6$ .............................. G06F 15/00; G06F 17/00
[52] U.S. Cl. .......................... 345/354; 345/326; 345/348; 395/51; 395/764
[58] Field of Search ..................................... 395/326, 348, 395/349, 50, 51, 52, 53, 54, 77, 900, 211, 212, 764; 345/352, 354

[56] References Cited

PUBLICATIONS

Decision Pad User Guide, Apian Software, 1991. pp. 8–3.
Sygenex, Inc. "Criterium, Because There Are Only Two Kinds of Decisions", Promotional Materials, Undated.
Apian Software, "Decision Pad 2.0", Promotional Material, Oct. 4, 1991.
Strassman, Paul A., "Decisions, Decisions", Inc., Nov., 1989.
Shapiro, Ezra, "Two Big Winners", BYTE, Apr., 1988.
Newtech, "Experts Choice" Promotional Materials, Undated.
Ching, Douglas, "Criterium: Making Hard Choices Easier", Lotus Magazine, May, 1990, p. 91.
Ferranti, Marc, "Sygenex's Decision–Support Upgrade Takes Step Toward Window Support", PC Week, Nov. 26, 1990, p. 34.
Decision Pad 2.0, Demonstration Diskette, Apian Software, Mar. 5, 1990.
Humphry, Sara, "Tools Help Objectify Decision Making", PC Week, Mar. 9, 1992, pp. 113–116.
Humphry, Sara, "Decision Pad Helps Medical Center Pick A Telephone System", PC Week, Mar. 9, 1992, pp. 113–117.
Coffee, Peter, "Computers Provide a Path to Decision Support in Office Environments", PC Week, Mar. 9, 1992, p. 113.
Logical Decisions, "Logical Decisions for Windows", Promotional Materials, Undated.

*Primary Examiner*—Kee M. Tung
*Assistant Examiner*—Ba Huynh
*Attorney, Agent, or Firm*—Fenwick & West LLP

[57] ABSTRACT

A computer system and method operate on a number of user interfaces to provide a graphical decision making tool that allows a user to graphically define and manipulate objects representing options, criteria, and ratings, to analyze and produce a decision. The user interfaces include an option rating window for each criterion for categorically rating the options with respect to the criterion. The option rating window includes a number of columnar category areas representing various categories for graphically evaluating the options, and a number of special rating areas for ascribing particular non-linear evaluations. The category areas are mapped to numeric rating scales so that the graphical position of a rating (associated with both an option and a criterion) produces a numeric rating for the option. The user interfaces further include a criteria weighting window for graphically establishing a criteria weight for each criterion. The user interfaces further include a decision table window that displays a matrix defined by the options and criteria and that displays the qualitative evaluations and summary ratings for each option, where the summary ratings of an option are based on the numeric ratings for the option.

29 Claims, 10 Drawing Sheets

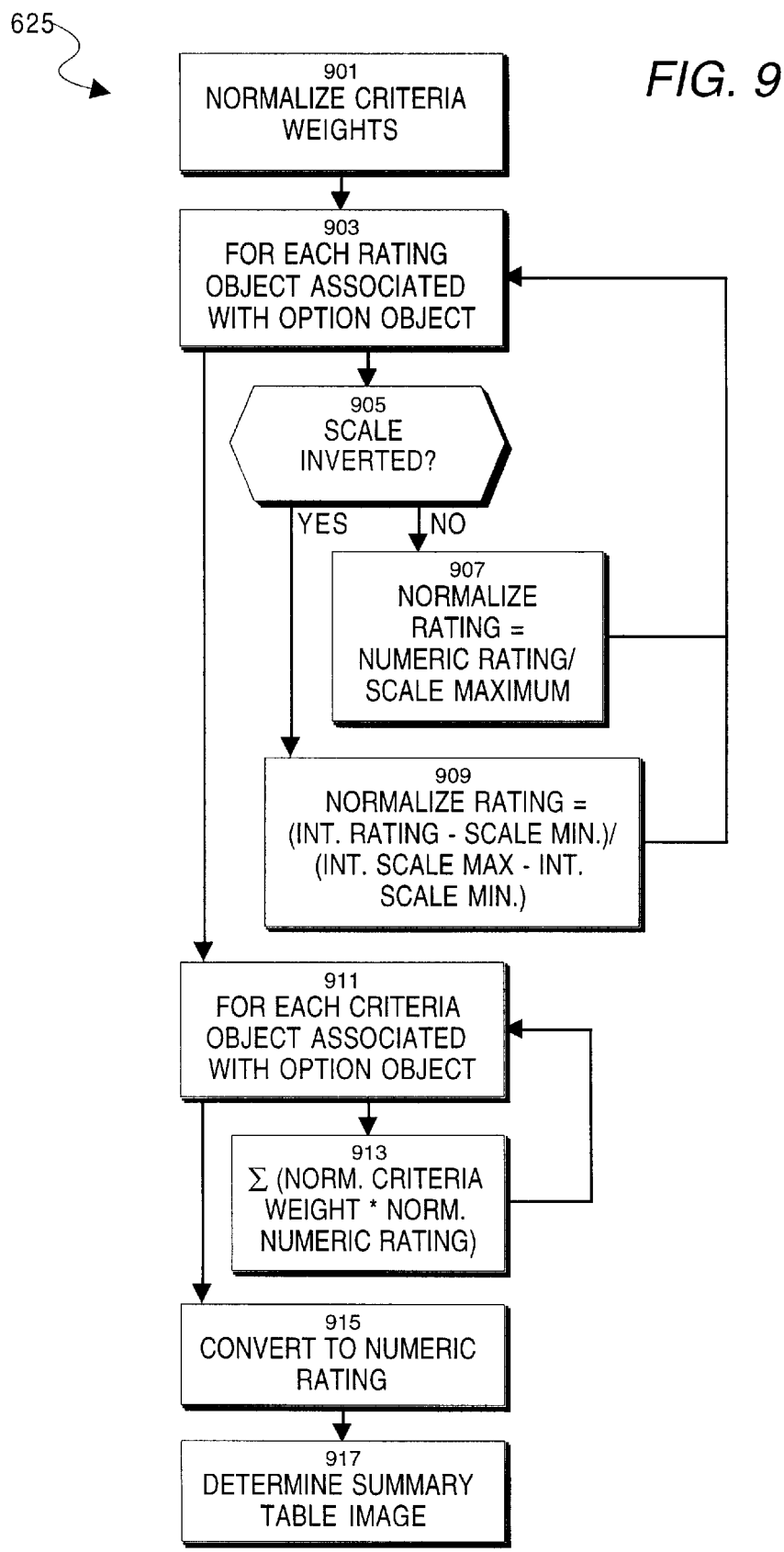

USER INTERFACE METHOD AND SYSTEM FOR GRAPHICAL DECISION MAKING WITH CATEGORIZATION ACROSS MULTIPLE CRITERIA

BACKGROUND

1. Field of the Invention

The invention relates to computer implemented systems for decision analysis, and more particularly to system and user interfaces for graphical decision making support.

2. Background of the Invention

In many decision scenarios, human decision makers evaluate a number of options with respect to various qualitative criteria, judging the relative performance of various options. In making these decisions, humans make several types of evaluations. First, humans typically judge whether one option is better than another option, and worse than a third with respect to some criteria. Second, human decision makers generally rely on qualitative categorization, such as evaluating one option as excellent on a particular parameter, and another option as poor. Third, human decision makers may prefer, or the nature of the decision or criteria may suggest, evaluating options in a binary fashion, such as whether an option passes or fails, or whether or not it satisfies all particular criteria.

In some decisions, the user may have choices for which particular criteria do not apply. Also, in decision-making scenarios, the decision maker does not have complete, perfect information, and may not know enough about an option to evaluate it. Even so, in these instances, humans are still able to come to a decision in the absence of complete information, or where some criteria apply to some options, and some criteria do not.

Thus, humans typically make decisions by making subjective, relative qualitative assessments about their choices, and by adjusting their decisions to accommodate gaps in their information. In these types of qualitative assessments, the user need not, and typically does not, have precise numerical data representing the evaluation of each of the options, criteria, and the like.

Computer-implemented, decision-analysis tools are known. Such tools typically require the user to perform much of the initial analysis of the various choices or options in a decision. Typically, the user must accumulate the data for various options, and determine a numerical assessment for each option. The user typically has to manually enter such numerical data for each of the options. These tools then merely perform various calculations on the data, and return a result to the user, again, typically in the form of a set of numbers, or as a sorted list of options, or the like. The user must then interpret the numbers to understand their significance.

The conventional types of decision tools are deficient in a number of ways. First, conventional decision analysis tools, because they rely primarily on direct data entry of numerical values, do not adequately support the more natural qualitative assessments humans use in their decision making. Some conventional decision tools force the user to convert qualitative assessments, which are natural for the human user, into quantitative values, which can be manipulated by the computer program. Because qualitative assessments are very subjective, and are often imprecise evaluations, the conversion to discrete numbers typically results in consistency errors, estimation errors, floor and ceiling constraints, and the like, and distort the resulting analysis. Other conventional decision tools force the user to simply forego the types of qualitative assessments that humans typically use, and to use some numerical representation consistent with the program's computational decision model. Where conventional decision tools do support qualitative inputs, they require the user to enter such inputs as text data, and do not support any graphical type inputs. Accordingly, conventional decision tools that rely entirely upon numerical evaluations fail to adequately capture and support the types of evaluations humans most often use. Other types of decision analysis tools, for example, those based on decision trees and probability analysis, require the user to learn about a complex theoretical field before the user can properly operate the decision tool.

Second, because most decision tools require extensive data entry, they typically do not provide an easy to use, graphically oriented user interface that can assist the user in the decision making process. More particularly, these tools, even when implemented in current personal computer operating system that support graphical user interfaces, such as Windows®, typically require the user to directly provide the numerical data that is used in the algorithms of the program. They do not take complete advantage of the graphical user interface, and allow the user to graphically manipulate elements of the decision, with the decision analysis tool interpreting such manipulations into the necessary numerical data. Other programs may allow some graphical editing or input, but limit the range of evaluation to linear analysis and ranking, which is not fully representative of the types of evaluations humans employ in making decisions.

Third, because most decision tools rely on numerical data entry, they do not exploit the power of graphical user interfaces to assist in the decision making process. Merely implementing a decision tool in a windowing environment is insufficient. Conventional tools fail to fully exploit human ability to make qualitative assessment through visual discrimination, such as through relative assessments of size, area, or position. In particular, human decision makers typically rely upon some form of visual pairwise comparison, where the observer visually assesses two selected options against each other at a time. Most decision tools do not provide the ability to make visual pairwise comparison, particularly among multiple options simultaneously.

Another limitation of conventional decision tools is that they do not provide the user with a means of integration explanatory information into the decision analysis. When a human makes a decision, for example, deciding which choice or options to assess, or on which criteria to assess the choices, or the particular evaluation of an option, there is almost always a reason that accompanies that part of the decision. The reasons for a particular evaluation, option, or other portion of a decision are a critical part of the human decision-making process, and are essential in order to justify the decision, typically to one's colleagues or superiors. However, conventional tools merely provide numerical analysis of options or the like, with no facility to input or integrate the reasons for decision in a meaningful way. While the user can keep notes or develop external documentation, such measures fail to support the decision-making process in an intuitive manner. For example, while some decision tools allow the user to insert comments on options or criteria, they provide no facility for the user to provide explanations of specific ratings, which can be a significant conceptual part of the decision making process, and which can provide the justification for the specific evaluations of the available options.

While some conventional decision tools may incorporate some limited graphical features, it is believed that there is no current decision tool available that integrates the variety of categorization, evaluation and explanation capabilities described above.

Accordingly, it is desirable to provide a decision analysis tool that provides a graphically based decision methodology that supports the style of qualitative assessment typically used by humans. Further, it is desirable to provide a decision analysis tool that integrates a variety of different qualitative evaluation techniques, and that supports the integration of explanatory material into the decision process.

SUMMARY OF THE INVENTION

The present invention overcomes the foregoing various limitations by providing a graphical decision tool with various user interface windows designed to support qualitative evaluation of options and criteria. The decision tool allows the user to define a number of options among which selection can be made in a given decision. The user is also able to define a number of criteria. The criteria are the factors that the user will use to determine the value or performance of each of the options. The present invention combines in a single user interface a common graphical manipulation scheme for evaluating the options against the criteria with both linear, and non-linear qualitative evaluations. The graphical user interface and manipulation techniques provide a powerful analytical tool supporting the types of decision analyses humans most comfortably perform, such as visual pairwise comparison, and visual assessments of size, position, color, and the like. The integration of linear and non-linear evaluations provides users with a full conceptual range of assessment options that are more naturally representative of the types of evaluations humans make internally.

In most decision making processes, the criteria defined by the user are not all of equal importance. Rather, the user subjectively feels that some criteria are more important than others. The more important a criterion is, the more heavily it should influence a decision. The decision tool includes a criteria weighting window in which the user is able to determine the relative importance or significance of the various criteria by graphically manipulating images representative of the criteria. The criteria weighting window has a weighting area divided into a number of columns, each column representing a category of importance, such as "High," "Medium," and "Low." The user can place criteria in any column and at any of a number of vertical locations in the column using a pointing device such as a mouse to implement a conventional drag and drop motion. The weighting area is mapped to a numeric scale with the visual top of the "High" column mapped to a scale maximum, and the visual bottom of the "Low" column mapped to the scale minimum, corresponding to an "Unimportant" evaluation for a criterion. Generally the numeric scale ranges from 0 to 10. Thus, the user's qualitative assessment of the importance of a criterion, defined by its location in one of the category columns is mapped to a numeric value on the numeric scale which becomes the criteria weight of the criterion.

The columnar arrangement of the criteria weighting window provides an easy to use and powerful analytical tool. The weighting area provides an easily grasped linear scale upon which the user can place the criteria, without having to estimate numerical weightings directly. The columnar arrangement provides strong category differentiation of the importance of various criteria. The user is able to make visual pairwise comparisons between selected criteria in order to determine and establish their relative significance. The user never has to input any numeric data in order to define the criteria weight, thereby relieving the user of having to make the type of numerical estimations conventional tools require.

The decision tool further provides a graphical interface for evaluating the options. For each user defined criterion, there is an option rating window with which the user rates each of the defined options. Again, the user graphically manipulates images representative of the options. The option rating windows are structured similarly to the criteria weighting window, having a rating area with a number of category columns representative of categories of qualitative performance for the options, such as "Excellent," "Good," "Fair," and "Poor." In a preferred embodiment, there is one option rating window used to rate each criterion. The rating area of the option rating window is mapped to a numeric scale that is specifically associated with the criterion; and this allows each criterion to have its own scale dependent on the meaning of the criterion.

This numeric scale has user definable scale minimum and maximum, but has default values of 1 to 10 respectively. The user can further define that the numeric scale of a criterion is inverted, so that a qualitative assessment at the "Excellent" end of the rating area maps to a low end of the numeric scale. This is useful for criteria, such as cost, with numeric scales representing actual dollar values, or similar criteria. The user is able to define the performance of each option with respect to the criterion for the option rating window by dragging and dropping the images associated with the option to a desired location in the rating area. Again, the user's qualitative assessment of the option is mapped to a specific numeric rating on the criterion's numeric scale.

In addition to the columnar rating area of the option rating window, the preferred embodiment includes a number of special rating category areas that are used to represent non-linear, qualitatively different types of ratings. More particularly, in some decision processes, for a given criterion, an option is more properly rated as either "Yes" or "No" with respect to the criterion. Similarly, for some criteria, it is preferable to rate options as either "Pass" or "Fail." In other cases, the user may not have sufficient information to rate an option with respect to a criterion, and thus can enter the rating as "Unknown." In other cases, a particular criterion may not apply to a user defined option, and thus the rating "N/A" or "not applicable." The option rating window integrates all of these possible ratings by including particular areas on the window where the user can drag the option to assign it one of these rating categories. This allows the user to provide any of a number of different qualitative evaluations to an option in a single window. Each of these rating categories is mapped to the numeric scale associated with the criterion. Thus, the user's qualitative, visual assessment and placement of an option is translated to a numeric rating for the option, again, without having the user enter any numeric rating directly.

Both the criteria weighting window and the option rating window provide additional user interface elements that facilitate and improve the user's ability to evaluate options and criteria. In some cases, the user's evaluation of two or more criteria, or options, may result in the images being very closely placed together in the window, to the extent that the images overlap. If the images overlap, it may become difficult for the user to select one of the images to further manipulate. Both windows thereby provide an overlap control viewing area that responds to the user's selection of any option or criteria displayed in the window, and lists that option and any option it overlaps or is overlapped by.

In establishing an evaluation of an option rating or the weighting of a criterion, the user will have particular reasons for deciding on the particular rating or weighting. The present invention allows the user to directly integrate an explanation of the reasons with the rating itself. An explanation window is provided in both the criteria weighting and option rating windows. When the user selects a criterion or an option, they can then enter text into the window that describes the reasons for the rating, or any other information the user desires. This provides the user with a single, uniform interface where all relevant information about a particular criterion, or rating of an option is displayed, and manipulable.

Finally, the present invention provides a user interface that summarizes the individual ratings of the options on the various criteria. A decision table window comprises a matrix of rows defined by the options, and columns defined by the criteria. The intersection of a row and a column is a rating cell that displays the rating of the option heading the row with respect to the criteria heading the column.

The decision table window displays the results of the various weighting and rating evaluations as follows. Each option has a summary rating. The summary rating for each option is a function of the individual option ratings in each of the option rating windows and the criterion weight given each criteria. The summary rating is computed such that an option rating of "Pass," "Fail," "Unknown," or "N/A" has no impact on the summary rating. This is because these qualitative evaluations should be neutral with respect to the qualitative evaluations that rate an option from "Excellent" to "Poor." Option ratings of "Yes," and "No," on the other hand directly impact the summary ratings, with "Yes" equivalent to "Excellent" and "No" equivalent to the lowest possible rating, below "Poor." The options and their associated row of option ratings are thereby listed in a sorted order depending upon the value of the summary rating. The numeric value of the summary rating is mapped into a qualitative value, displayed as a summary image, that corresponds to the rating categories of "Excellent," "Good," "Fair," "Poor." However, if an option is rated "Fails" on one or more criteria however, this option is rated as a "Fails" summary image, regardless of its other ratings. In this manner, the user can immediately perceive in the decision table the individual option ratings, the final summary ratings, and the resulting ordering of options.

BRIEF DESCRIPTION OF THE DRAWINGS

FIG. 9 is a flowgraph of one embodiment for determining the summary rating of an option object.

DETAILED DESCRIPTION OF THE INVENTION

System Architecture

Overview

Figure 1:
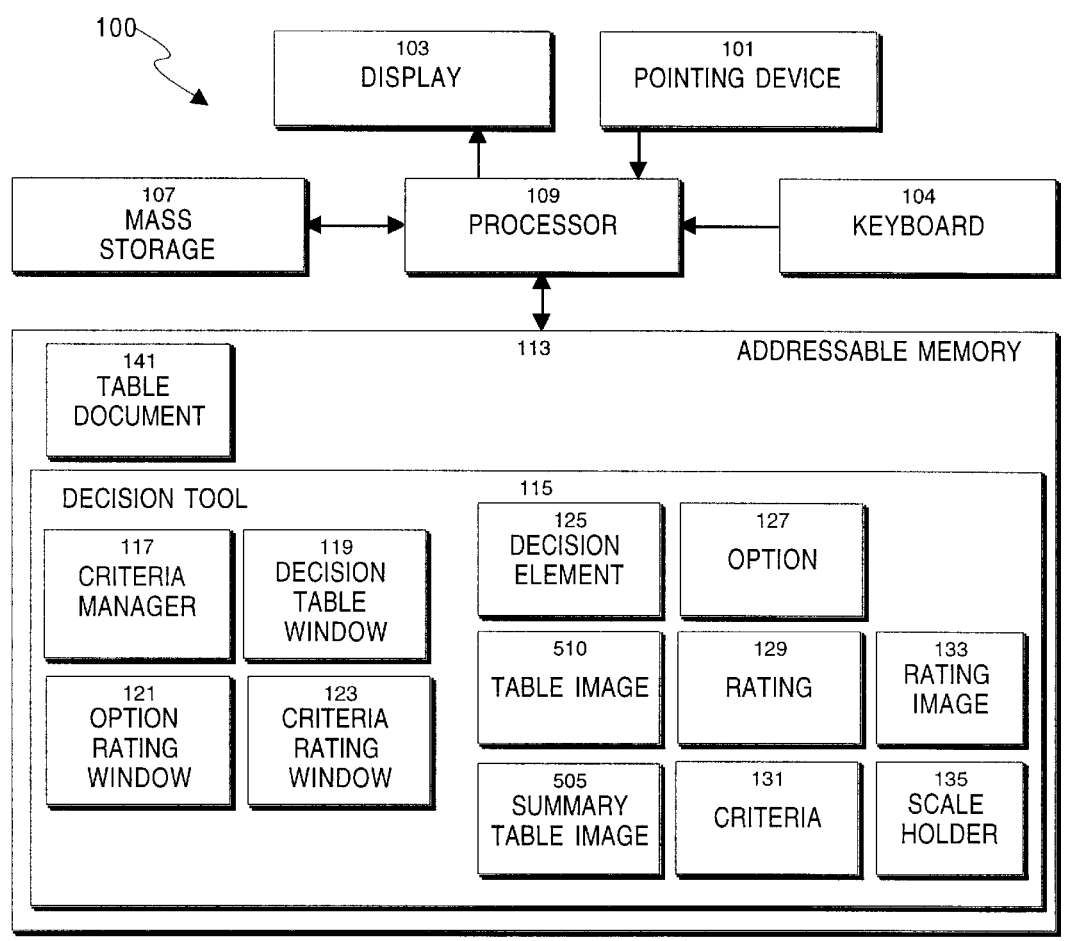
FIG. 1 is a block diagram of a computer system providing the graphical decision tool of the present invention.

Referring now to FIG. 1, there is shown one embodiment of a computer system providing the graphical decision making tool of the present invention. The system includes a conventional computer 100, having an addressable memory 113, a processor 109, a pointing device 101, a display 103, a keyboard 104, and a mass storage device 107. The computer 100 may be realized by most general-purpose computers, such as IBM-compatible PC's. Any other general-purpose computer may also be adapted for use with the invention.

The addressable memory 113 further includes the decision tool 115 of the present invention. The decision tool 115 is an executable application controlling the operation of the computer 100 to provide a user interface on the display 103 that facilitates a decision making process of the user. The decision tool 115 includes a number of code objects, and is preferably created with an object oriented programming language, such as C++. The code objects present the addressable memory 113 and are executed by the processor 109 in a conventional manner. The processor 109 also reads and writes data and code files to and from the mass storage device 107.

Decision Tool Classes and Objects

Figure 2:
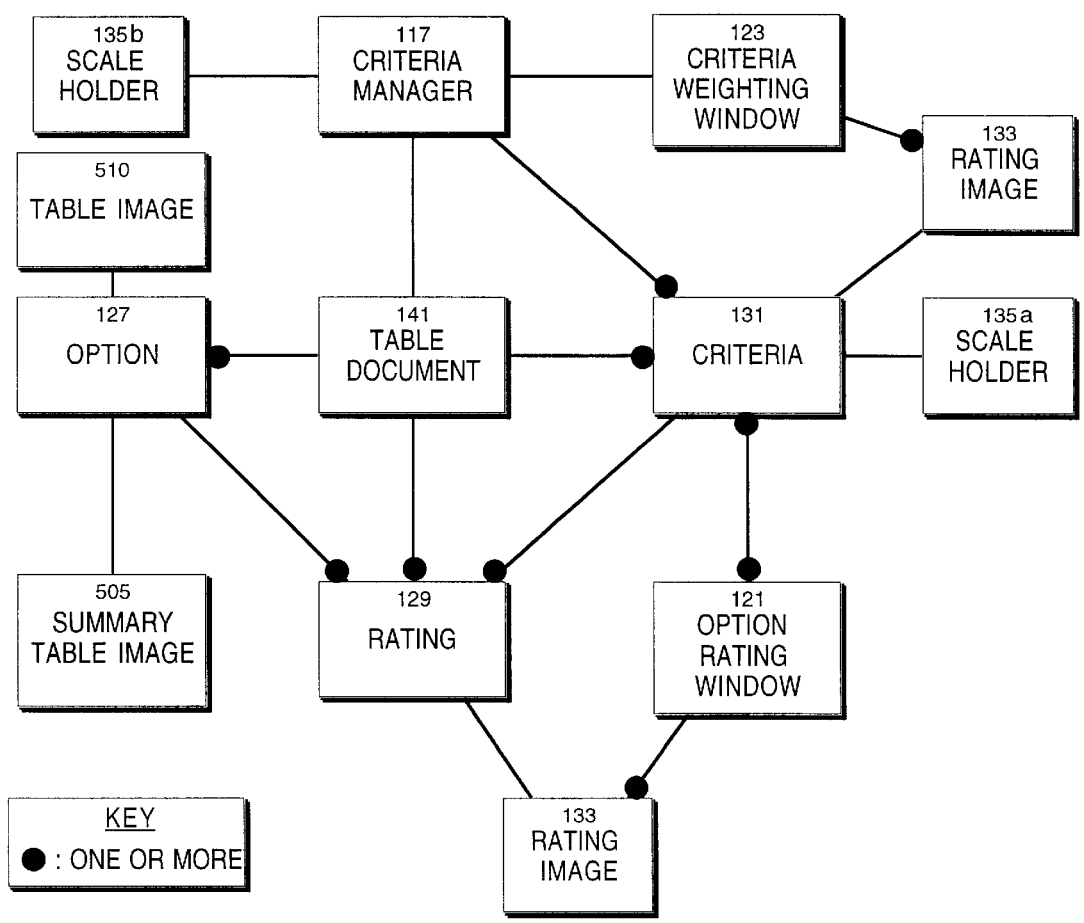
FIG. 2 is an object model of the decision tool.

The code objects of the decision tool 115 include a criteria manager 117, a decision table window 119, one or more option rating windows 121, a criteria weighting window 123, and a number of object classes used to instantiate various elements of a given decision analysis. There are also provided object classes that interface with the various windows, and handle the display and updating of the images of other objects. These classes are the rating images 133, table images 510, and summary table images 505. The addressable memory 113 also stores table documents 141 that are created by the decision tool 115, and which contain and manage the particular objects and data associated with a given decision making instance The instantiated objects and data for a particular decision analysis are persistently stored in a table document 141. FIG. 2 illustrates the basic object model of the decision tool 115 showing object associations and cardinality. The attributes and methods of the objects are not illustrated. A table document 141 stores all of the data related to a single decision making process, and manages the decision table window 119. This includes all of the options, criteria, ratings, and their values as assigned by the user. The table document 141 is created and read by the decision tool 115.

In a decision making process provided by the decision tool 115, one or more options are evaluated with respect to one or more criteria. The criteria are the qualitative factors that are used to determine the value of each of the options. The user defines a number of options that are to be decided between in coming to a decision. The user further defines a number of criteria upon which each of the options is to be evaluated. The user determines the relative significance of the various criteria using the criteria weighting window 123, by graphically manipulating images representative of the criteria. The user evaluates each of the defined options with respect to each of the criteria, using the option ratings windows 121, again, graphically manipulating images representative of the options. Each such evaluation produces a rating of the option with respect to a specific criterion.

A summary rating for each option is determined by the table document, and representative images are displayed to the user in the decision table window 119 in an ordered and ranked fashion. The summary rating for each option represents its overall performance on the user defined criteria. This allows the user to visually determine the relative strength of each option on each criterion, and the overall performance of each option with respect to the other options.

The object classes used to represent these elements include an option class 127, a criterion 131, a rating class 129, and a rating image class 133. Each of these classes includes storage structures that store their respective data and methods that handle that data. In the following description, references to objects derived from these classes will use the same reference numbers.

Options

The option class 127 is used to store data descriptive of each option being considered for a decision. In a given decision there is at least one option object 127 instantiated to create the decision analysis. However, interesting decisions will have at least two options 127, since with only one, the outcome is known a priori. Each option 127 preferably includes a text data item for storing a name or other user defined identifier of the option. As an example, assume a decision process with five option objects 127 respectively named "Good Choice," "Off The Wall Choice," "Medium Quality Choice," "Poor Choice," and "Awful Choice." Another text data item stores a textual description of the option 127, allowing the user to store further descriptive details about the option, such as its source, contact information, vendor data, or any other useful information.

Each option object 127 is associated with a rating object 129 for each criterion established by the user. In a preferred embodiment, each option object 127 and each criterion object 131 maintains a set of pointers to its associated rating objects 129, and each rating object 129 contains a pointer to its option object 127 and its criterion object 131. To access the rating of an option on a specific criterion, one useful search strategy entails obtaining a list of rating objects 129 from the option object 127, and then searching that list for a rating object 129 whose criterion object 131 matches the specified criterion. The rating objects 129 informs the option object 127 of the option's rating on a particular criterion. Each option object 127 includes a method that determines the summary rating of the option object 127 based on the option's rating on each of the criterion defined by the user. This method will be described below with respect to FIG. 9.

Criteria

The criteria class 131 is used to store and manipulate data descriptive of each of the criterion on which each of the options 127 are evaluated by the user. In a given decision there is at least one criterion object 131 instantiated. Each criterion object 131 includes a criteria name, a text data item descriptive of the name of the criterion. For example, in a given decision, the user may define criteria objects 131 named "Quality," "Cost," and "Flexibility," each representative of a different qualitative or quantitative factor that the user believes is significant for the decision. Each criterion object 131 further preferably includes a criterion explanation, a text data item that stores user input data describing the criterion, such as the reasons for choosing the criterion, the meaning of the criterion, and the like.

Each criterion object 131 is associated with a scale holder object 135*a*. The scale holder object 135*a* defines a numeric scale that is used to convert a graphically based qualitative evaluation of an option object 127 on the criterion object 131 into a number. The scale holder 135*a* associated with a criterion object 131 stores a criterion scale minimum value and a criterion scale maximum value. The values can be set by the user, and have a default value of 1 and 10 respectively. The numeric scale of the scale holder 135*a* is used to determine the rating of each option object 127 on the criterion 131.

The scale holder 135*a* further stores an inversion flag indicating whether the numeric scale is inverted, which means that lower valued numbers are "better" than higher valued numbers along the scale. For example, for a "Cost" criteria, where the numeric scale maximum and minimum values have been defined by the user to approximate the dollar range of the cost of the options, then the user would set the inversion flag, indicating that lower numbers, or lower cost, are better than higher cost.

Each criterion object 131 further includes a numerical rating that is its criterion weight. The criterion weight provides a relative ranking or ordering of the various criterion objects 131, indicative of the significance or importance of the criteria to the user. Each criterion object 131 determines the value of its criterion weight on basis of, and in response to, the position of its rating image 133, as displayed to the user in the criteria weighting window 123. When the user moves the rating image 133 of a criteria object 131 in the criteria weighting window 123, the criteria object 131 updates its criteria weight in response thereto. The method for updating the criteria weight is further described below.

Ratings

The rating class 129 is used to store and manipulate the evaluation of the options 127 with respect to a criteria 131. Thus, each rating object 129 is uniquely associated with a specific option object 127 and a specific criteria object 131, and holds the numerical value which is the rating of the option object 127 with respect to the criteria. Thus, each option object 127 is associated with one rating object 129 for each criteria object 131. Each rating object 129 thereby stores data identifying the criteria object 131 and option object 127 associated with it. This allows data to be passed from a criteria object 131 to an option object 127 through the intermediary rating object 129. Each rating object 129 further stores a rating explanation, a text data item that the user can input to explain the reasons or basis of the rating that user provides for a given option object 127 on a given criterion.

Rating Images

A rating image object 133 is an object that stores a graphic data element, along with its location, color, and the like, that is displayed to the user in either the criteria weighting window 123 or the option rating window 121. The rating image 133 can be selected by the user with the pointing device 101 and moved about the screen display, and placed in available locations in the criteria weighting window 123 or the option rating window 121. A rating image 133 is associated with either a rating object 129 or a criteria object 131, depending on whether it is used in either option rating window 121 or criteria weighting window 123, respectively. A rating image 133 informs the object with which it is associated of its position within its window whenever the position is changed by the user, the associated object updating the appropriate rating value in response thereto. The rating image 133 provides a visual representation of the numeric rating of the associated object, so that the user can easily and efficiently compare, contrast, and update the ratings of the associated object all through a conventional drag and drop operation implemented using the pointing device 101.

For a rating image 133 associated with a criteria object 131, the rating image 133 further stores and displays the name of the criteria object 131. The rating held by the criteria object 131 is determined by the criteria object 131 in response to changes in the position of the associated rating image 133 on the criteria weighting window 123.

For a rating image 133 associated with a rating object 129, the rating image 133 displays the name of the option object 127 associated with the rating object 129. The rating held by the rating object 129 is determined by the rating object 129 in response to changes in the position of the associated rating image 133 on an option rating window 121.

In the preferred embodiment, the option objects 127, criteria objects 131, and rating objects 129 are subclasses of a decision element abstract base class.

Decision Table Window

Figure 3:
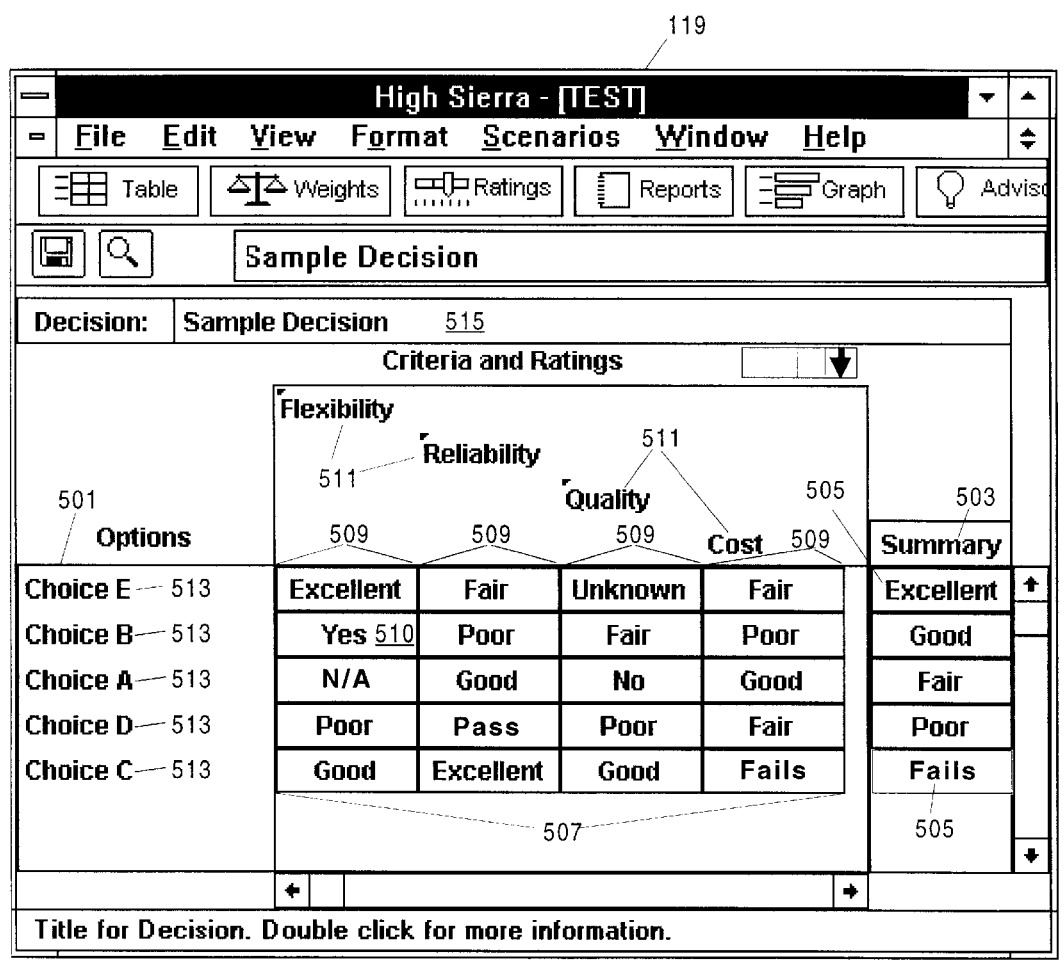
FIG. 3 is an illustration of one embodiment of the decision table window.

Referring now to FIG. 3, there is shown one embodiment of the user interface component of the decision table window 119. The decision table window 119 displays the results of the user's evaluation of the various options against the defined criteria. The decision table window 119 presents the results of the evaluation in a consolidated graphical manner that allows immediate pairwise comparison of options, and an understanding of the relative performance of each of the options.

The decision table window 119 is comprised of several areas. Near the top of the decision table window 119 is a decision name text field 515. In this field the user can type a short descriptive name for the decision being made.

On the left hand side of the decision table window 119 is the option column 501. The option column lists the option names 513 of the option objects 127 defined by the user. Here, the user has defined options labeled "Choice A," "Choice B," and so forth to "Choice E." The option names are listed in order according to the sorted order of the summary rating, represented by the summary table images 505, which are displayed in the summary column 503. Each summary table image 505 displays a qualitative label descriptive of the overall performance of an option on all of the criteria.

In the middle of the decision table window 119 is the rating matrix 507. The rating matrix 507 includes a matrix of table images 510. The matrix 507 is formed of columns 509 representative of the criterion objects 131 defined by the user, and headed by the criteria name 511, and the rows defined by the option names 513. In the sample decision illustrated in FIG. 3, the user has defined criteria of "Flexibility," "Reliability," "Quality," and "Cost." Only four criteria have been illustrated in this example, but more may be defined, with the decision table window 119 scrolling to the left and right to display additional criteria. Each table image 510 represents the rating that the particular option object 127 has on a particular criterion. This rating corresponds to the qualitative or quantitative categorization that the user applies to the particular option in the option rating window 121 window, as further described below.

The table images 510 include a text label descriptive of the performance of a selected option on a selected criteria, the label corresponding to an underlying numeric rating calculated by a rating object 129 with respect to the criteria. The text label is preferably one of "Excellent," "Good," "Fair," "Poor," "Fails," "Unknown," "Pass," "N/A," "Yes," and "No" though other similar labels may also be used.

The summary table images 505 are displayed in sorted order. Each option object 127 is responsible for determining its summary rating, based on its rating in each of the option rating windows 121. A method by which each option object 127 determines its summary rating will be described below, after an explanation of the criteria weighting window 123 and the option rating window 121, since these windows are used to establish the values upon which the summary rating is determined.

In a preferred embodiment, the table document 141 is used to maintain the list of option objects 127 and a list of criteria objects 131. The table document 141 is in charge of constructing the image of the decision table window 119 on the display 103. The list of option objects 129 is kept sorted, the sort order being based on the summary ratings, as further described below (with inclusion of the special case when an option is rated "Fails" ). The criteria object 131 list is also maintained in sorted order based on criteria weight. The table document 141 computes the locations for the objects on the display 103 based on their sort order, the height of a row, and width of a column in the rating matrix 507. Each option object 127, rating object 129, and criterion object 131 includes methods for constructing an image of itself. The table document 141 requests an image from each decision element, then computes the position at which to display that image. Furthermore, the criteria objects 131 and option objects 127 have pointers back to the table document 141. Thus, when the option object's summary rating changes, or when the criterion object's weight changes, the object informs the table document 141 that this change has occurred. The table document 141 re-sorts the appropriate list and repositions the elements on the table as needed.

The summary table images 505 each includes a text label descriptive of the overall performance of the option on all of the criteria on which it is rated, and correlated with the summary rating. In the preferred embodiment text labels include "Excellent," "Good," "Fair," "Poor," and "Fails."

In addition to their text labels, the table images 510 and the summary table images 505 may be color coded with selected colors representing each category. The colors for the table images 510 and the summary table images 505 should be selected to be readily distinguishable, and suggestive of the category of assessment. In the preferred embodiment, the colors for the summary table images 505 are light green, dark green, yellow, red, black, for the above listed categories, respectively, though other colors may be used. For the table images, these colors are also preferably used for the similarly labeled categories, along with blue for "N/A" and "Pass," white for "Unknown" and the same light green for "Yes" as for "Excellent" (the reason for this correspondence will be described below). A dark brown is used for "No." Other color combinations may also be used. The preferred selection of colors allows the user to quickly identify in both the rating matrix 507 and the summary column 503, the various categorical assessments of the options. It further allows the user to perform rapid pairwise comparisons of the selected options to see how each option was comparatively rated on various criteria.

Criteria Weighting Window

Figure 4:
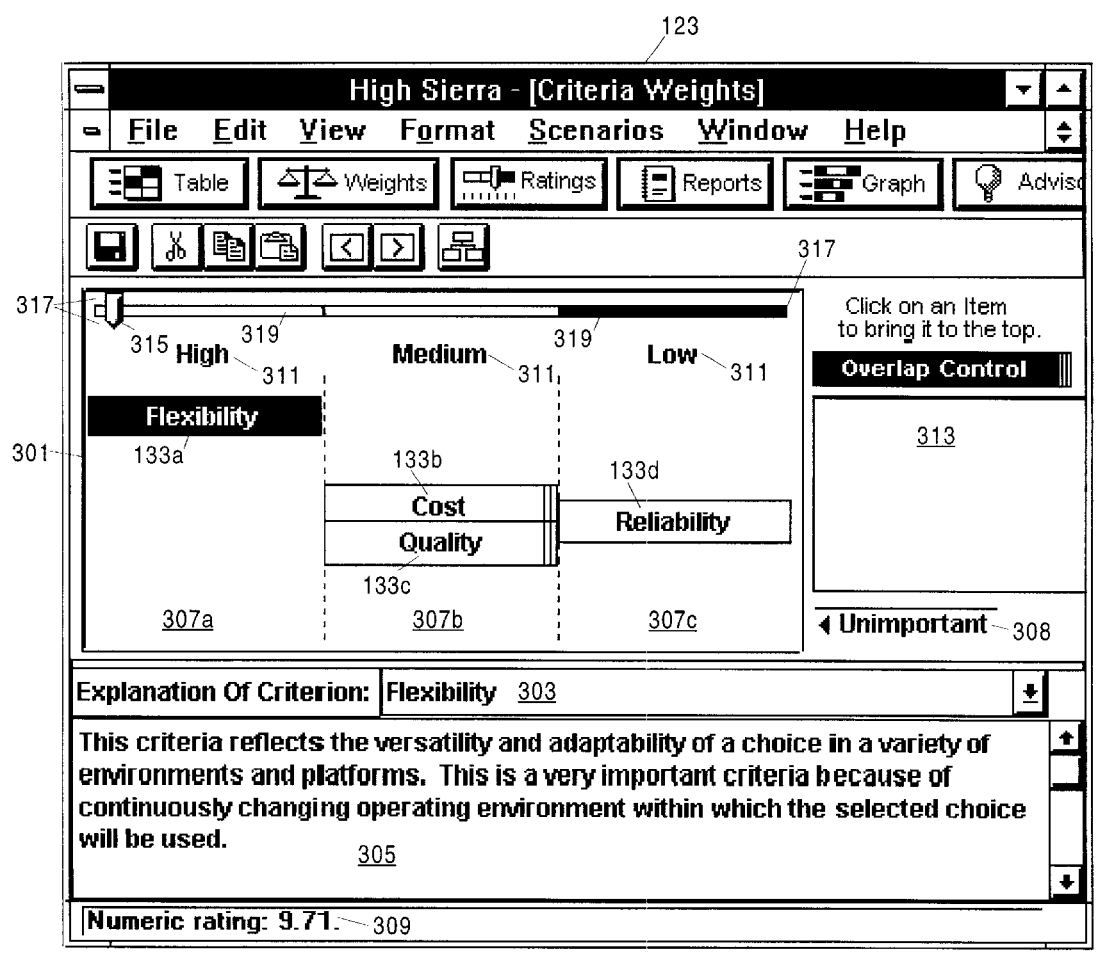
FIG. 4 is an illustration of one embodiment of the criteria weighting window.

Referring now to FIG. 4, there is shown one embodiment of the user interface component of the criteria weighting window 123. The criteria weighting window 123 is used to graphically adjust the relative significance the criteria objects 131 defined by the user, which in turn causes the criteria manager 117 to update the criteria weights of the is underlying criteria objects 131. The criteria weighting window 123 allows the user to perform visual pairwise comparison of the significance of various criteria, and to manually adjust the criteria, without ever having to manually input numerical ratings for the criteria. Rather, the numerical ratings of each criteria object are determined in response to the user's adjustment of the rating images 133 associated with the criteria objects 131 in the criteria weighting window 123.

The criteria weighting window 123 includes a weighting area 301. The weighting area 301 comprises a number of criteria weighting areas 307. In the preferred embodiment, the criteria weighting areas 307 are structured as columns distributed across a horizontal axis. Each criteria weighting area 307 includes a number of contiguous locations. In the preferred embodiment, these locations are distributed along the vertical axis of the columns.

Each criteria weighting area 307 is headed by a weight category 311. The weight categories 311 represent general qualitative levels of the significance of a criteria object 131. In the preferred embodiment, there are three default weight categories 311, "High," "Medium," and "Low." These category labels may be modified by the user, as appropriate for a given decision making process. For example, other category labels such as "Critical," or "Interesting," or "Significant," or "Irrelevant," may be used. In an alternate embodiment, the number of criteria weighting areas 307 may be modified by the user or the applications developer. The division of the weighting area 301 into criteria weighting areas 307 allows the user to perform both vertical pairwise comparisons between pairs of selected criteria in a given criteria weighting area 307, to determine the relative weighting or strength of the selected criteria within a given category, and horizontal pairwise comparisons to determine a more general categorical weighting of selected criteria across weight categories.

Within the weighting area 301 the user places and moves rating images 133 associated with the criteria objects 131. The user is able to select (click) with the pointing device 101 a rating image 133, and move (drag) the rating image 133 to any desired location within one of the criteria weighting areas 307 of the weighting area 301. When the user releases the rating image 133, the criteria object 131 updates the criteria weight according to the new location of the rating image.

The weighting area 301 is mapped to the numeric scale of the scale holder 135b for the criteria manager 117, with each criteria weighting area 307 mapped to a selected range of numeric ratings on the numeric scale. The mapping allows the location of each rating image 133, as determined by the user, to be converted to a criteria weight for the criteria object 131 associated with the rating image 133. The mapping associates the top of the leftmost criteria weighting area 307a with the scale maximum of the numeric scale, and the bottom of the rightmost criteria weighting area 307c with the scale minimum of the numeric scale. The bottom of each criteria weighting area 307 is then mapped as immediately prior to, and continuous with the top of the criteria weighting area 307 to the immediate right. In FIG. 4, the bottom of criteria weighting area 307a is immediately prior to the top of column 307b, and the bottom of criteria weighting area 307b is immediately prior to the top of criteria weighting area 307c. The numeric scale for the scale holder 135b of the criteria manager 117 has a default scale minimum of 0.0 and a default scale maximum of 10.0.

In the preferred embodiment, the lower right hand corner of the weighting area 301 is designated with a text label "Unimportant" 308 since this location is mapped to the scale minimum of 0.0, which results, as further described below, in the criteria having no impact on the summary ratings of the option objects 127. Thus, logically the criteria is conceptually unimportant. Being able to include criterion that the decision maker considers unimportant, and to explain why it is unimportant, is valuable for presentation and dialectic purposes—if the decision maker presents the resulting decision analysis to another person who thought the criterion was important, the decision maker has a placeholder for the criterion, and an explanation of why it was unimportant, or irrelevant, to the decision process. This improves the likelihood that the decision maker will obtain consensus from other individuals involved in the decision making process.

From this mapping of the weighting area 301 to the numeric scale, the criteria weight of any criteria object 131 can be determined. The computation of the criteria weight is made by the criteria object 131 according to the following formulas and terms, and the location of the rating image 133 of criteria object 131 in the window (where the criteria weighting areas 307 are structured as columns):

F=fraction of rating range, where the rating range is the weighting area 301 in the criteria weighting window 123 or the rating area 401 in the option rating window 121;

N=number of columns;

L=number of columns to the right of current column;

D=vertical distance from bottom of column to top of column;

V=distance of rating image from bottom of column;

$S_{max}$=scale maximum;

$S_{min}$=scale minimum;

$S_{range}$=scale range;

R=rating;

$$F = \frac{L + \left(\frac{V}{D}\right)}{N} \qquad \text{QE. 1}$$

$$S_{range} = S_{max} - S_{min} \qquad \text{Eq. 2}$$

$$R = S_{min} + (F * S_{range}) \qquad \text{Eq. 3}$$

By way of example, the numeric rating of the criteria objects 131 associated with the rating images 133a–d in FIG. 4 will be determined. It will be assumed that D, the vertical distance is 100 pixels (for ease of computation). Further, the numeric scale is the default scale of zero to ten. For the rating image 133a, associated with a "Flexibility" criteria object 131, the rating R is:

$$F = \frac{2 + \left(\frac{100}{100}\right)}{3} = 1;$$

$$S_{range} = 10 - 0 = 10;$$

$$R = 0 + (1*10) = 10.$$

The rating R is assigned to the criteria weight for the criteria object 131. For the "Cost" criteria object 131, associated with the rating image 133b, which is about half-way up the middle criteria weighting area 307b, the rating R is 5. For the "Reliability" criteria object 131, associated with the rating image 133d which is about one-third of the way up the rightmost criteria weighting area 307, the rating R is:

$$F = \frac{0 + \left(\frac{33}{100}\right)}{3} = .111;$$

$S_{range} = 10 - 0 = 10;$ $R = 0 + (0.111 * 10) = 1.11.$

The equations for the computation of a rating R apply to both the criteria weighting window 123 and option rating window 121, as described below, as both of these windows share the same structure with respect to the columns of the rating area. In addition, Equation 1 has been slightly simplified in that it does not account for the vertical height of a rating image 133. The vertical height H of a rating image 133 is accommodated in Equation 1 as follows:

$$F = \frac{L + \left(\frac{V}{D - H}\right)}{N} \quad \text{Eq. 1 (rev.)}$$

where V is measured from the y-coordinate of the upper edge of the rating image 133 to the bottom of the criteria weighting area 307.

The criteria weighting window 123 further includes two graphic elements that further aid the user in weighting the criteria. A weighting slider 315 is disposed in a horizontal weighting scale 317 running across the top of the weighting categories. The weighting scale 317 is divided into color coded sections 319, the physical width of each section 319 corresponding to the physical width of the column 307 over which it is disposed. The entire width of the weight scale 317 is mapped to the numeric scale in a direct linear fashion, in accordance with the inversion flag for the numeric scale. Thus, if the inversion flag indicates a regular (low to high) ordering, then the left end of the weighting scale corresponds to the scale maximum and the right end corresponds to the scale minimum. In addition, the numeric range of each section 319 corresponds to the numeric range of the column 307 over which it is disposed.

When a rating image 133 of a criteria object 131 is selected, the weighting slider 315 is positioned by the criteria weighting window 123 to a position on the weighting scale 317 corresponding to its mapped numeric rating. This will place the weighting slider 315 within the section 319 corresponding to the column in which the rating image 133 is located. Within that section 319 the weighting slider 315 will be positioned toward the left or right ends of the section 319 in the same relative amount that the rating image 133 is near the top or bottom of the column 307, respectively.

The user can adjust the criteria weight of a criteria object 131 with the weighting slider 315 by selecting the rating image 133 for the criteria object 131, and then selecting and dragging the weighting slider 315 to a desired position in the weighting scale 317. When the user releases the weighting slider 315, the criteria weighting window 123 will cause the criteria object 131 to update its criteria weighting on the basis of the mapped numeric value for the weighting slider 315 at its new position. The criteria object 131 will then inform the rating image 133 of the new criteria weighting, and the rating image 133 will update its position on the weighting area 301 to correspond with the predetermined criteria weighting.

The numeric rating for a selected rating image 133 is continuously displayed and updated in a numeric rating field 321 in the lower right hand corner of the criteria weighting window 123. This allows the user to continuously monitor the actual underlying numeric rating, and determine its precise value, should the user so desire. This reinforces the visual assessment and weighting created by the user, and provides a further level of detailed information to the user, should the user desire.

The criteria weighting window 123 includes a criterion selector 303 that displays the criteria name of a criteria object 131 associated with a rating image 133 selected by the user with the pointing device 101. The criterion selector 303 is an alphabetically ordered drop menu or menu list showing the names of all the criteria objects 131 from which the user can select. Once so selected, the name of the selected criteria object 131 is placed in the criterion selector 303 and the rating image 133 for the selected criteria object 131 is brought to the front of the display and highlighted in a conventional manner. Rating image 133a is shown highlighted in inverse video, with the name of the criteria object 131 for "Flexibility" shown in the criterion selector 303. This feature allows the user to quickly and randomly access any of the criteria objects 131, and to visually locate the rating image 133 in the weighting area 301. This feature is particularly useful where there are numerous criteria objects 131 defined by the user, and as a result, many, potentially overlapping rating images.

When a rating image 133 is selected, either directly with pointing device 101, by the criterion selector 303, or otherwise, the user is able to enter or modify the text for the criteria explanation in the criteria explanation text window 305. In addition, each time a user selects one of the rating images 133 in the weighting area 301, the explanation text for the associated criteria object 131 is displayed. This allows the user to immediately determine and update any information significant to the weighting of the criteria. This tight integration of explanatory information with actual assessment significantly aids the user in documenting the decision process for later review and evaluation.

Because the user may desire two or more criteria objects 131 to have the same or about the same significance, the criteria weighting window 123 allows the user to position rating image 133 in such a manner that they overlap, either partially or entirely. For example, the user may choose to have two different criteria objects 131, such as "Cost" and "Quality," to have the about the same significance, such as "Medium." In order to identify which rating images 133 overlap, the criteria weighting window 123 includes an overlap box 313. When the user selects a rating image 133, the criteria weighting window 123 determines which other rating image(s) 133 overlap with the selected rating image 133 and displays the criteria name(s) of the criteria object(s) 131 associated with the overlapping rating image(s) 133. Where the user selects one of several overlapping rating images 133 via the criterion selector 303, the selected rating image 133 is highlighted and brought to the front of the overlapping set of rating images 133. The position of the weighting slider 315 on the weighting scale 317 is also updated, as is the criteria explanation text in the explanation text window 305.

Finally, as noted above, each location in a criteria weighting area 307 is mapped to a specific criteria weight. Since the user may desire to know what that criteria weight is, the criteria weighting window 123 includes a numeric rating field 309 that displays the criteria weight of the criteria object 131 associated with a currently selected rating image 133. In the example of FIG. 4, the "Flexibility" criteria object 131 has a criteria weight of 9.71.

Option Rating Window

Figure 5A:
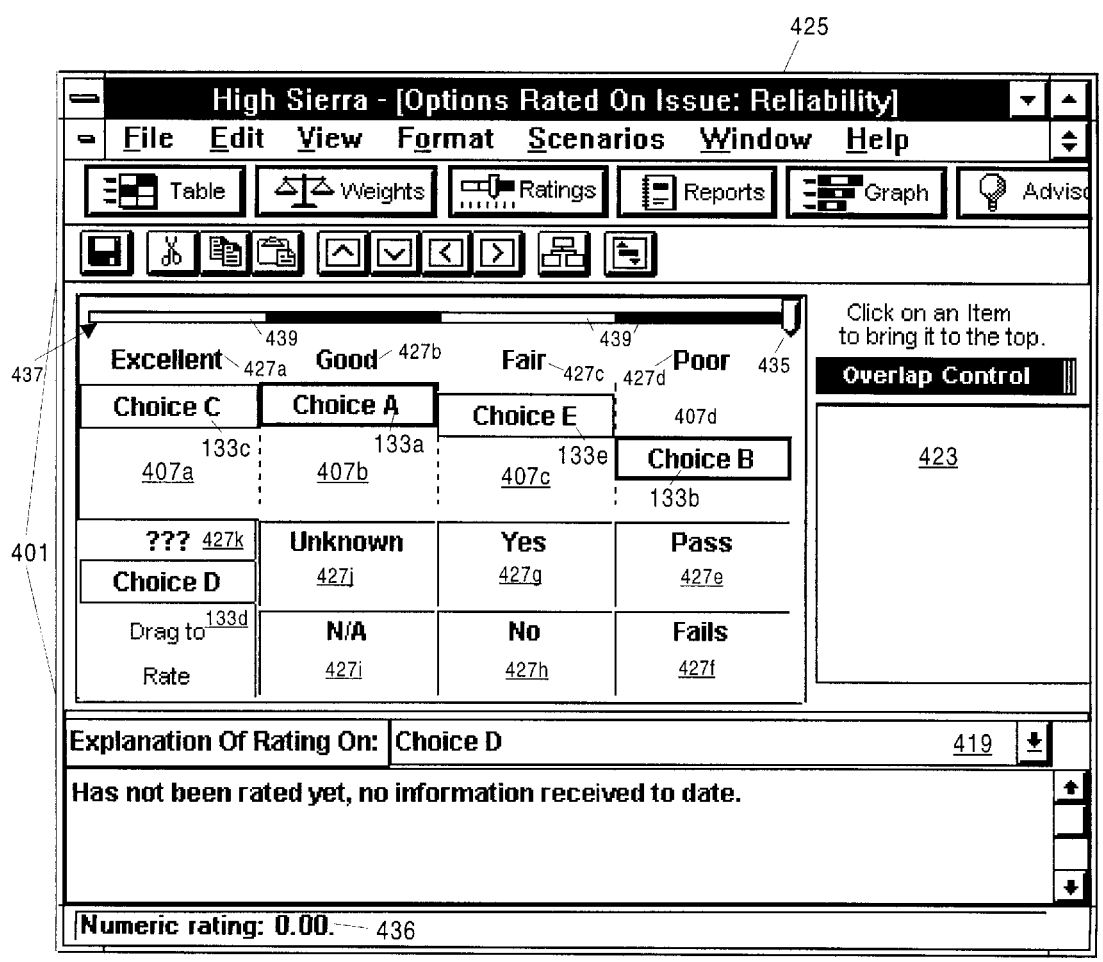
FIGS. 5a and 5b are illustrations of one embodiment of option rating window.
Figure 5B:
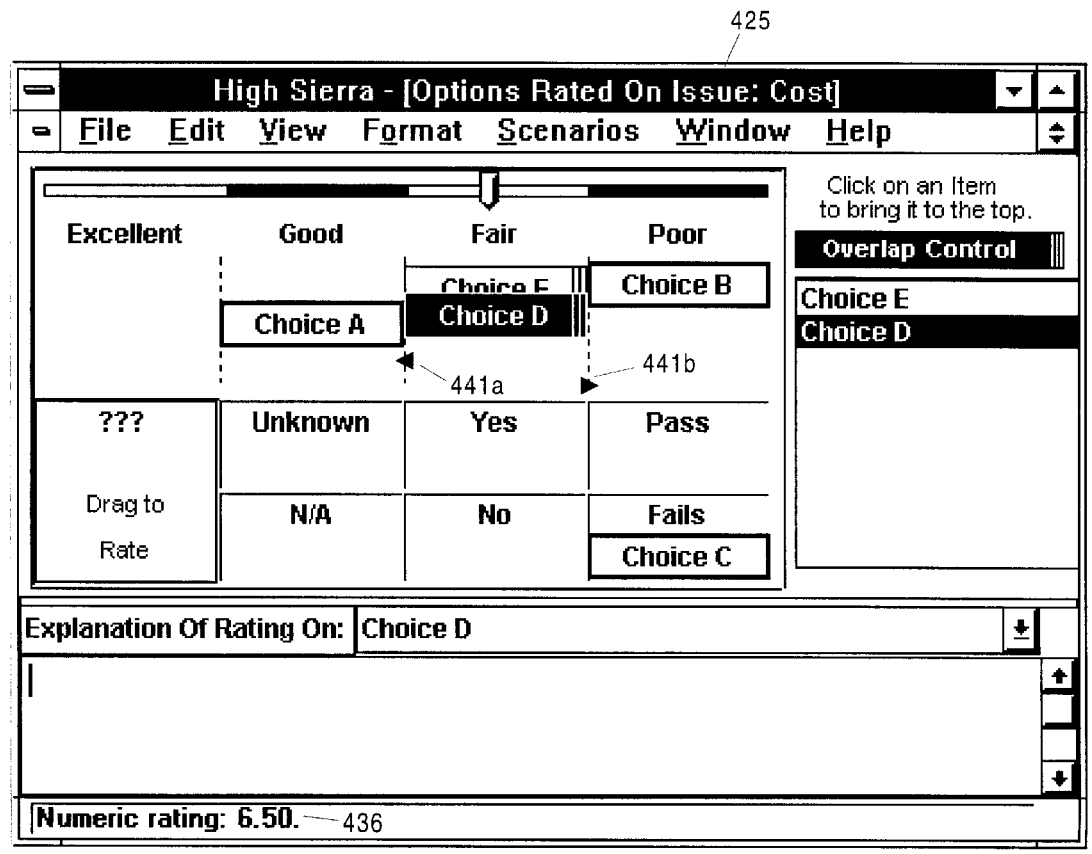

Referring to FIGS. 5a and 5b, there is shown one embodiment of the user interface component of an option rating window 121. There is one option rating window 121 for each criteria object 131 defined by the user. This allows the user to independently evaluate each option (via the option objects 127) with respect to each criteria. Each option rating window 121 is used by the user to graphically adjust the relative performance of the option objects 127 defined by the user with respect to the criteria object 131 associated with the option rating window 121. Each time an option is adjusted in the option rating window is 121, the rating of the option is updated, along with the summary rating of the option, and the overall ordering of all of the options in the decision table window 119. The option rating window 121 includes all of the structural features of the criteria weighting window 123 including the weighting area (here identified as rating area 401) with respect to rating images 133, a rating image selector, and an overlap control. The option rating window 121 is conceptually different in that it is used to rate options, rather than weight criteria.

Referring to FIG. 5a, an option rating window 121 includes in the title bar 425 the criteria name of the criteria object 131 with which the option rating window 121 is associated. This coheres with the fact that there is one option rating window 121 for each criteria object 131 defined by the user. In the example of FIG. 5, the option rating window 121 is for rating options with respect to the Reliability criteria, and hence that name is displayed in the title bar 425.

The option rating window 121 includes an option rating area 401, which generally operates in the same manner as the weighting area 301 of the criteria weighting window 123. Within the option rating area 401 the user is able to evaluate each option on a variety of qualitative rating categories 427. First, the option rating area 401 includes a number of category areas 407. In the preferred embodiment the category areas 407 are structured as columns. Each category area 407 is headed by the label of a rating category 427a–d. The rating categories 427a–d are representative of general qualitative range of performance for an option along the criteria. In the preferred embodiment, there are four default qualitative rating categories 427a–d, preferably labeled "Excellent," "Good," "Fair," and "Poor." These rating categories 427a–d may be modified by the user, as appropriate for a given decision making process.

In this portion of the rating area 401, the user is able to place rating images 133 associated with rating objects 129, which are in turn associated with their option objects 127. The user is able to select (click) with the pointing device 101 a rating image 133, is and move (drag) the rating image to any desired position within one of the category areas 407 of the weighting area. When the user releases the rating image 133, the rating value is updated by the rating object 129 associated with the rating image. This portion of rating area 401 allows the user perform visual pairwise comparison of selected options, via their rating images 133. That is, the user is able to visually determine the "strength" of each option relative to other options, and adjust the strength of each option by moving its associated rating image.

The category areas 407 in the rating area 401 are mapped to the numeric scale of the scale holder 135b for the particular criteria object 131 associated with the option rating window 121. The mapping is preformed in the same way as with the weighting area 301 of the criteria weighting window 123. The mapping allows the position of each rating image 133 for its associated rating object 129, as positioned by the user, to be converted to a rating value for the rating object 129. For non-inverted scales, the mapping associates the top of the leftmost category area 407a with the scale maximum of the numeric scale, and the bottom of the rightmost category area 407d with the scale minimum of the numeric scale. The bottom of each category area 407 is then mapped as immediately prior to, and continuous with the top of the category area 407 to the immediate right.

If the numeric scale of the criteria object 131 associated with an option rating window 121 is inverted, the scale maximum is mapped to the lower right-hand corner of the rating area 401, and the scale minimum is found in the upper right-hand corner. Thus, a rating image 133 placed at the top of the "Excellent" category area 407a, such as "Choice C," results in a numeric rating equal to the scale minimum, and a rating image 133 placed at the bottom of the "Poor" category area 407d results in a numeric rating equal to the scale minimum.

The option rating window 121 also includes its own weighting slider 435 and weighting scale 437. These features operate in the same manner as the weighting slider 315 and weighting scale 317 of the criteria weighting window 123. More particularly, the weighting scale 437 extends across the top of the rating categories 427, and is divided into color coded sections 439, each section 439 corresponding to a rating category 427, and having a same width as the category area 407 associated with the rating category 427. The entire width of the weighting scale 437 is mapped to the numeric scale associated with the particular criteria object 131 with which the option rating window 121 itself is associated. Thus, for a criteria object 131 such as "Cost" where the numeric scale may be inverted, the left end of the weighting scale 437 represents an "Excellent" rating, which in turn is the minimum numeric rating. The operation of the weighting scale 437 and weighting slider 435 is the same as that described above.

Referring to FIG. 5b, the option rating window 121 includes a further feature that allows the user to quickly determine the sensitivity of a selected option to a change in its rating on a particular criteria with respect to the overall ranking of the option against other options. This is the sensitivity marker 441. When a rating image 133 is selected by the user, here the image for "Choice B," there may be displayed in the columns of the rating area 401 one or two sensitivity markers 441. An upper limit sensitivity marker 441a indicates visually the location that the rating image 133 of the underlying option object 127 would have to be moved to in order to change the summary rating of the option object 127 sufficiently to increase the ranking of that option with respect to other options. A lower limit sensitivity marker 441b indicates visually the location that the rating image 133 would have to be moved to decrease the ranking of the option with respect to other options. Thus, the sensitivity markers 441 indicate the range in which the rating image 133 may be adjusted without affecting the overall result of the decision. In some cases, where two option objects have very close summary ratings, the sensitivity markers 441 may be placed very close to a selected rating image 133, indicating that a minor change in the option rating will affect the overall result. In other cases, the performance of an option on other criteria may be such that for the criteria associated with a currently displayed option rating window 121, the sensitivity markers 441 would be very widely displaced from the rating image, indicating a large amount of change would be necessary to affect the overall ranking. For the option that is most highly rated overall, there will only be a lower limit sensitivity marker 441b, since that option cannot "improve" relative to other options. Likewise, for the option that is lowest rated overall, there will only be an upper limit sensitivity marker 441a displayed. Sensitivity is preferably calculated by the criterion object 131, which determines the option object 127 associated with a selected rating object 129, then obtains from the table object summary rating differences between that option object 127 and the option objects nearest it in strength to find the option object 129 with the closest summary rating. The criterion object 131 then determines from the summary rating of the closest option object, what a current rating for the associated option object 127 would have to be for its summary rating to match the summary rating of the closest option object.

The sensitivity markers 441 allow groups of users to very quickly arrive at a consensus on both the rating of a particular option, and on an overall decision. This is because two different users, even though they would have different rankings of the option, will see by the sensitivity markers 441 the range of option ratings for which the result in the overall ranking of summary ratings will be the same. This makes it easier for the users to agree on an option rating anywhere within the range displayed between the sensitivity markers 441.

Each rating image 133 is associated with a rating object 129, which, as described above, determines a numeric rating according to the position of the rating image 133 in the rating area 401. The rating object 129 passes this information to its associated option object 127. This allows the option object 127 to recompute its overall summary rating. The numeric rating for a rating image 133 is determined by the rating object 129 according to Equations 1–3 set forth above. For example, the option "Choice D" represented by rating image 133b in FIG. 5b has a numeric rating of 6.50. This value is displayed in numeric rating field 436.

Where the numeric scale of a scale holder 135a is inverted, the scale holder 135a includes an internal scale that is a negation of the external numeric scale accessible by the user. The internal scale is the negation of the numeric scale. The internal scale minimum is the negative of the numeric scale maximum and the internal scale maximum is the negative of the numeric scale minimum. Accordingly, where the numeric scale of a scale holder 135a runs from 0 to 100, and the user has set the inversion flag, the internal scale runs from (–100) to 0. Thus, the bottom of the rightmost category area 407d is also mapped to an internal scale value of –100, and the top of the left most category area 407a is also mapped to an internal scale value of 0.

When the inversion flag is set, the rating object 129 uses the internal scale to determine an internal scale rating for the option The internal scale rating is translated to the numeric rating on the numeric scale for user viewing. The translation is of the internal scale rating to the numeric rating as follows:

$$\text{numeric rating} = -(\text{internal scale rating} - \text{internal scale maximum}). \quad \text{Eq. 5}$$

For example, assume the user has set the numeric scale maximum and minimum values at 100 and 0 respectively, and inverted the scale. The bottom of the category area 407d has internal scale rating of –100, and a numeric rating of –(–100–0)=100, which is the lowest rating on the numeric scale since the user choose to invert it. Deriving the internal scale rating from the numeric rating uses the transformation formula:

$$\text{internal scale rating} = (\text{internal scale maximum} - \text{numeric rating}). \quad \text{Eq. 6}$$

In addition to the four rating categories 427 described above, the option rating window 121 integrates a number of other qualitative assessment factors as rating categories 427, allowing the user to make variety of different types of evaluation of each option in a single unified option rating window 121.

First, with respect to some types of criteria or options, it is useful to rate whether an option either passes or fails a given criteria, instead of providing a relative assessment of the option. The option rating window 121 integrates this ability by providing rating categories 427 identified as "Pass" 427e and "Fail" 427f. The user can evaluate an option object 127 with respect to these categories by selecting and dragging the rating image 133 associated with the underlying rating object 129 to the desired rating category 427, whether "Pass" or "Fail."

Similarly, in some instances the semantics of a user defined criteria are such that it is primarily meaningful to determine whether or not a given option does or does not have the criteria. For example, where the decision being made is which new car to purchase, the options being defined as different models of new cars, and one criteria defined as whether a car has power windows, there need only be a positive or negative determination of this fact, and not a qualitative assessment across the "Excellent" through "Poor" categories 427a–d. The option rating window 121 integrates the ability to make these types of evaluations through the use of the "Yes" 427g and "No" 427h rating categories. The user can evaluate an option object 127 with respect to these categories by selecting and dragging the rating image 133 associated with the underlying rating object 129 to the desired rating category 427, whether "Pass" or "Fail."

In many real world decision making problems, there is the possibility that for a given option, one or more of the user defined criteria does not apply to the option. In the previous example, if one of the user defined criteria is "Gas Mileage" and one of the options is an electric vehicle, then the user should be able to indicate that the criteria does not apply to the option. In order to accommodate the ability to make these types of evaluations, the option rating window 121 integrates a rating category 427 that means "not applicable." In the embodiment of the option rating window 121 illustrated in FIG. 5a, this is rating category "N/A" 427i. The user can evaluate a particular option object 127 by dragging the rating image 133 for the rating object 129 associated with the option object 127 to this rating category 427i.

In many real world decisions, the user may not have complete information about the nature of each option with respect to each criteria. Continuing the previous example, the user may not know how good the gas mileage is for a particular car option. In order to still evaluate the option in the absence of information, the option rating window 121 integrates an "Unknown" rating category 427j. The user can indicate that the evaluation of a particular option object 127 is unknown for a criteria by dragging the rating image 133 for the rating object 129 associated with the option object 127 to "Unknown" category 427j.

Finally, when an option is to be rated for the first time, it will appear at a "to be determined" rating category 427k, illustrated in FIG. 5a as "???." Placement here indicates to the user that the option has not yet been rated. FIG. 5a shows an example of this with the rating image for "Choice D" placed in rating category 427k, and the explanation text field 421 includes user-entered text data indicating that the option has not yet been evaluated with respect to the reliability criteria.

These rating categories 427e–k are mapped to the numeric scale of the scale holder 135b in a specific manner in order to properly account for the qualitative significance of the rating. The "Yes" category rating 427g is preferably mapped to the scale maximum of the numeric scale (and properly mapped to an inverted scale where appropriate). This makes the placement of a rating image 133 in the "Yes" category rating 427g equivalent to placing it at the top of the left most category area 407a. In alternate embodiment, the "Yes" category rating 427g may be mapped to a numeric rating less than the scale maximum, but still indicative of an affirmative evaluation of the option with respect to the criteria object 131.

The "No" rating category 427h conceptually represents the failure of an option to satisfy a particular criteria, and not merely the lowest possible rating on the scale used to rate other options. Accordingly, the "No" rating category 427h is mapped to 0.0 on the numeric scale, regardless of the scale minimum and scale maximum values. Thus, an option which is rated at bottom of the "Poor" category area 407d, will have a numeric rating equal to the scale minimum, (which is by default 1 but may have other values), but an option rated "No" on the same criteria will have a numeric rating of 0.0.

The "Fails" rating category 427f, like the "No" rating category 427h, represents the failure of an option to satisfy a criteria, and so is mapped to a numeric rating of 0.0. In addition, as further described below, the "Fails" rating category 427h causes the summary rating of the option object 127 to be placed at the bottom end of the ordered summary ratings.

The "Pass" rating category 427e, the "Unknown" rating category 427j, and the "N/A" rating category 427i all are mapped to a numeric rating of 0.0 on the numeric scale for the scale holder 135a associated with the criteria object 131. This numeric rating is correct for each of these rating categories because conceptually, each of these categories should have no impact on the overall rating of an option with respect to all of the criteria. For example, if a given option is rated "Excellent" on four out of five criteria, a "Pass," an "Unknown" rating, a "???" rating, or a "N/A" rating on the fifth criteria should neither detract or enhance the overall rating of the option. This is consistent with most users' mental model of these rating categories. In order to accommodate this result with the overall summary rating, the numeric rating is set to 0.0 for these rating categories 427. The impact of a 0.0 numeric rating, and how it causes the rating to have no influence the overall rating is further described below.

The option rating window 121 includes an option selector 419 that includes the option name of an option object 127 associated with a rating image 133 selected by the user with the pointing device 101. The option selector 419 further acts as an alphabetically ordered drop down menu or list containing the option names of the option objects 127. The user can thereby cause the selection of any one of the rating images 133 by choosing the option name from the option selector 419. This feature allows the user to quickly and randomly access any of the rating objects 129 without having to locate the appropriate rating image 133 in the rating area 401. This feature is particularly useful where there are numerous option objects 127 defined by the user. When an option is selected by any means, the name of the option object 127 is placed in the option selector 419. The user then is able to enter or modify the text of the rating explanation in an explanation text field 421, indicating the reasons the user has for a given rating.

Because the user may desire two or more option objects 127 to have the same or about the same significance, the criteria weighting window 123 allows the user to position rating image 133 in such a manner that they overlap, either partially or entirely. For example, the user may choose to have two different option objects 127 which the user desires to have the same rating or strength on a given criterion. In order to identify which rating images 133 overlaps, the option rating window 121 includes an overlap box 423. When the user selects a rating image 133, the option rating window 121 determines which other rating image(s) 133 overlaps with the selected rating image 133 and displays the option name(s) of the option object(s) 127 associated with the overlapping rating image(s) 133. For example, in FIG. 5b, the rating image 133 of "Choice D" is selected (shown by inverse video). This rating image overlaps with the rating image of "Choice E." The names of all the options are listed in the overlap box 423, with the name of the option for "Choice D" highlighted. In addition, the rating image of "Choice D" is brought to the front and displayed in front of the rating image of "Choice E."

Criteria Manager

The criteria manager 117 sorts the criteria objects 131 according to their criteria weights whenever there is a change in the criteria weight of any criteria object 131.

The criteria manager 117 is associated with its own scale holder 135b. This scale holder 135b derives from the same class as the scale holders 135a associated with the criteria objects 131. The scale holder 135b of the criteria manager 117 stores a numeric scale with a scale minimum of zero and a scale maximum of ten. This numeric scale is used by each of the criteria objects 131 to update their criteria weight.

System Operation

Performing Decision Analysis

Figure 6:
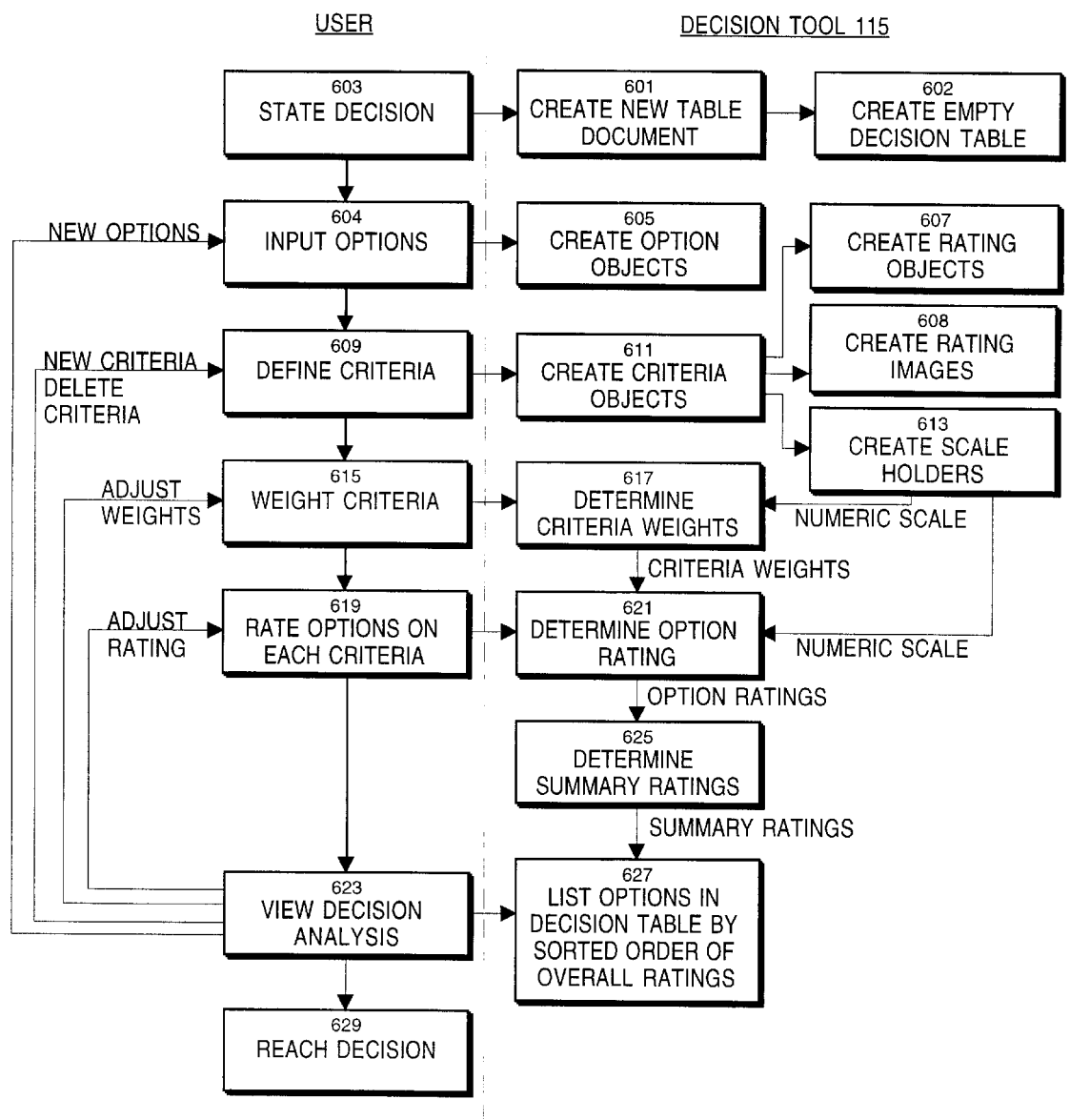
FIG. 6 is a flow graph of one embodiment of the process of creating a decision analysis.
Figure 7:
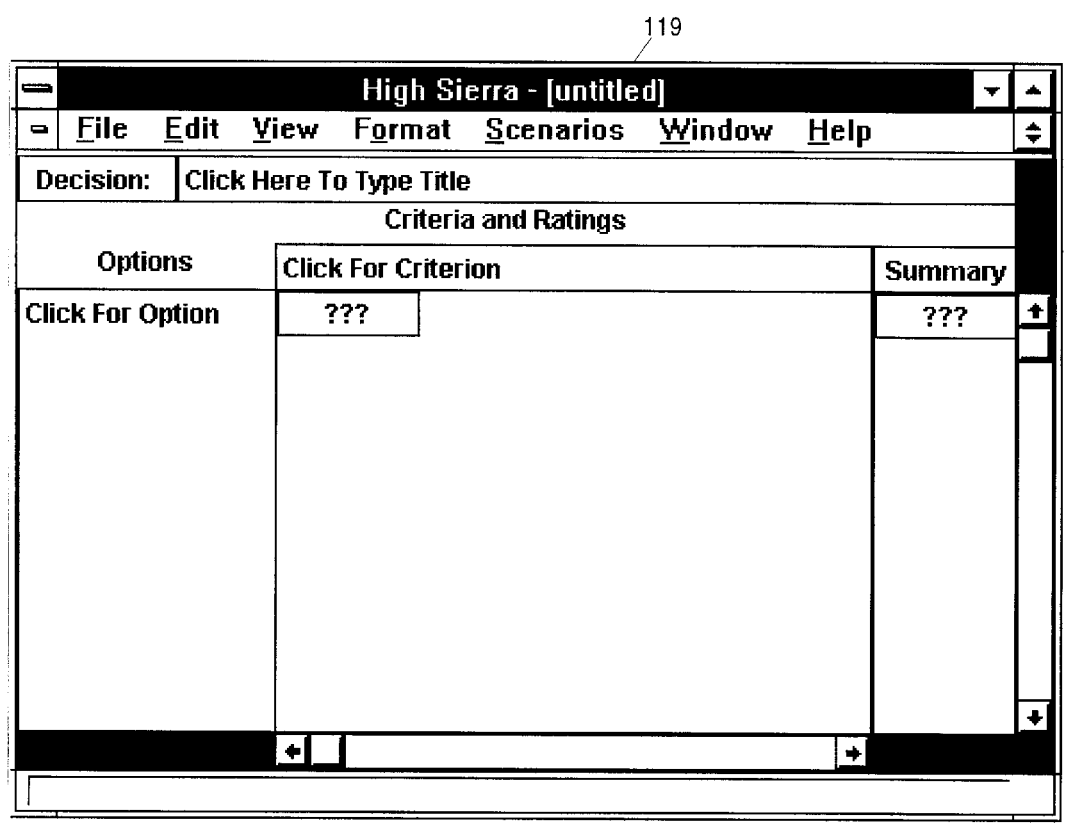
FIG. 7 is an illustration of an empty decision table window in which the user begins the decision analysis process.

Referring now to FIG. 6, there is shown a flowgraph of the preferred method of performing decision analysis with the decision tool 115 of the present invention. The process begins with the decision tool creating 601 a new table document 143 for storing the various objects and data of the decision, and creating 602 an empty decision table window 119 which will be used to store and display the final results of the decision analysis. FIG. 7 illustrates an empty decision table window 119 in which the user begins the process of decision analysis.

The user states 603 what the decision is, and inputs the decision name into the decision name text field 515 of the decision table 119. The user specifies an initial set of options that are to be evaluated, and from which one or more options can be selected as a result of the decision making process. The options are input 604 one by one, preferably by selecting in the option column 501, and entering the option names for the desired options. The decision tool 115 takes each input option name and creates 605 an option object 127.

The user defines 609 a number of criteria upon which each of the options is to be evaluated. In the preferred embodiment, this is done by selecting the untitled criteria name 511 in the decision table 119 and inputting the name of the criteria. The decision tool 115 creates 611 a criteria object 131 for each input criteria name, and creates 613 for each criteria object 131 a scale holder 135a that is associated therewith.

Figure 8:
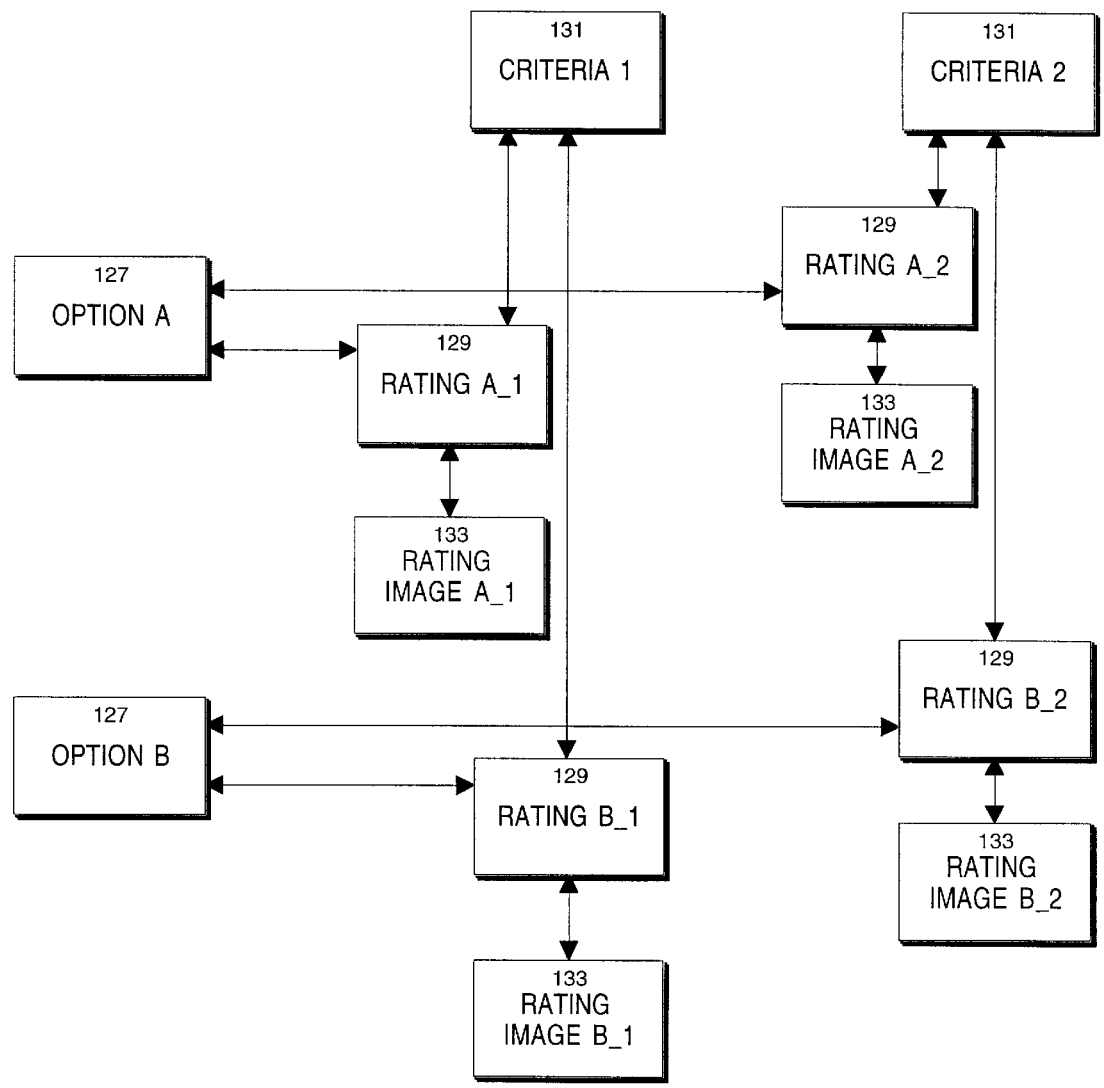
FIG. 8 is an illustration of the associations between various option objects, rating objects, and criteria objects.

For each option object 127, and for each criteria object 131, the decision tool 115 creates 607 a rating object 129 for holding the rating of option on the criterion. The decision tool 115 associates the option object 127 with each of its rating objects 129, and each rating object 129 with the particular criteria object 131 that it operates on. For each rating object 129, the decision tool 115 creates 608 a rating image 133, and associates these two objects together, so that a particular rating image 133 will be used to display the rating on a particular option rating window 121. FIG. 8 illustrates a sample set of objects and their associations in a decision analysis with two options and two criteria. The associations between objects are bi-directional so that the link can be traversed in either direction. For example, an option A_1 has the interface of its rating A_1, and can invoke its method for determining the option's rating on criterion 1, and likewise, the rating A_1 has an interface to option A_1 that updates the value of its rating.

Referring again to FIG. 6, the user weights 615 the defined criterion, preferably by manipulating the rating images 133 of each of the criteria objects 131 in the criteria weighting window 123, or by selecting a rating image 133 of a criterion and adjusting the weighting slider 315. The user may also specify the scale maximum and scale minimum of the scale holder object 135b for a given criteria object, and make the scale inverted. Each of the criteria objects 131 determines 617 its criteria weight according to the position of its rating image 133 in the criteria weighting window 123.

The user then rates 619 each of the options on each of the criteria. This is preferably done by selecting one of the criteria to start with, manipulating each of the rating images 133 of the option objects in the option rating window 121 for the criterion, and progressing to the next criterion and its associated option rating window 121. The user may also select a rating image 133 for an option and adjust the weighting slider 435. In one embodiment, the user may access an option rating window 121 for a criterion by double clicking on the criteria name in the decision table window 119.

After the user rates an option, moving the rating images 133 in an option rating window 121, the rating image 133 informs its associated rating object 129 that it has changed location. The rating object 129 obtains the position of the rating image 133, and the numeric scale from the scale holder 135b associated with the current criterion. The rating object 129 then determines 621 the option rating. The rating object 129 updates its rating image 133, if necessary, to reflect the change in the rating. This process of determining the rating 621 is repeated each time a user causes a change in the rating of an object, either directly in an option rating window 121 through the manipulation of the rating images 133 and weighting slider 435, or indirectly by adjusting the criteria weights in the criteria weighting window 123.

As the option ratings are updated, each rating object 129 informs its associated option object 127 of the change, passing in the new option rating to the option object 127. Each option object 127 that has a change in one of its ratings then determines 625 its summary rating, and updates its summary table image 505 with the new summary rating value.

Each option object 127 that has a change in its summary rating informs the table document 143 of the change. The table document 143 stores the order of the option objects 127 in the decision table window 119. The table document 143 resorts the option objects 127 according to their summary ratings to determine whether any option object 127 has changed position in the ordering of the summary ratings. Where an option object 127 has a rating of "Fails" on at least one of the criteria, then the summary rating of the option object 127 is not used to determine the ranked order of the option object 127. Rather, this option object 127 will be placed at the very bottom of the ordered list of option objects 127. The principle here is that if an option completely fails to satisfy a criterion, then it cannot be an acceptable alternative to any of the other options. The table document 143 informs all the option objects 127 affected by the sorting to position 627 their summary table images 505 in the decision table window 119.

The user views 623 the resulting decision analysis in the decision table window 119. The user (or users in a group decision making process) may choose to return to one of the earlier steps, and define new options, define new criteria or delete criteria that have no significant impact on the decision, adjust the weights of the criteria, or adjust the ratings of any of the options. These steps may be repeated until the user is satisfied with the resulting decision, or where there are several decision makers, when a consensus is reached with respect to the options and their ranking. At this point the user reaches 629 a decision.

Determination of Summary Rating

Referring now to FIG. 9, there is shown a flowchart of one method used by each option object 127 to determine its summary rating, as described at step 625 of FIG. 6. The summary rating is displayed via a summary table image 505 in the summary column 503 of the decision table window 119. This process of determining the summary rating is effected by an option object 127 each time there is any change in the numeric rating of a rating object 129 for the option object 127 resulting from a change in the evaluation of the option object 127 either in the option rating window 121 for a particular criterion (either through direct manipulation of the rating image 133 for the object, or by weighting slider 435), or from the change in the criteria weighting of a criteria object 131.

The option object 127 normalizes 901 the criteria weights of each the criteria objects 131 associated with it. This is preferably done by summing the criteria weights of all criteria objects 131 that are associated with the option object 127, and then dividing the criteria weight of each criteria object 131 by the sum of the criteria weights. Each normalized criteria weight is in the range 0 to 1. The sum of all the normalized criteria weights of all of the associated criteria objects equals 1.

When summing the criteria weights, special handling of the criteria weights is used when the option object 127 is has a rating of "Fail," "Pass", "N/A," "???", or "Unknown." All of these rating categories 427 have a numeric value of 0.0. If the option object 127 has rating in one of these categories for a criteria object 131, then the criteria weight is not included in the summed criteria weights, and criteria weight is not normalized by dividing by the summed criteria weights. As a result, the rating of 0.0 will not mathematically influence the overall rating.

For a "Fails" rating, leaving out the criteria weight allows the user to determine in the decision table window 119 how the option would have ranked in the absence of the "Fails" rating. In one embodiment, the user may select a suitable menu option which causes the display of the underlying summary ratings in the summary table images 505, rating that the text label.

A criteria object 131 may have a criteria weight of 0.0, if the user places the rating image 133 for the criteria object 129 at the "Unimportant" location of the weighting area 301. This criteria weight is used the same way other criteria weights are used and consequently the normalized strength of criteria weight is also zero. As a result, the individual option ratings on an "Unimportant" criterion have no impact on the computation of the summary rating for any option object 127 rated thereon.

The option object 127 loops 903 over each rating object 129 associated with it in order to determine a normalized numeric rating for each rating object 129 on its criterion. This is done by determining 905 whether the scale holder 135b for the criteria object 131 associated with the rating object 129 is inverted, that is whether its inverted flag is set. If the scale is not inverted, then the normalized numeric rating is determined 907 as the numeric rating divided by the scale maximum. Otherwise, if the scale is inverted, then the normalized numeric rating is determined 909 as:

$$\frac{\text{internal numeric rating} - \text{scale minimum}}{\text{internal scale maximum} - \text{internal scale minimum}} \quad \text{Eq. 7}$$

The internal numeric rating is the negation of the numeric rating displayed to the user, when the scale is inverted. Each normalized numeric rating falls in the range 0 to 1.

The option object 127 then loops 911 over the criteria objects 131, and sums 913 the products of the normalized criterion weight by the normalized numeric rating of the rating object 129 associated with the criteria object. This will produce a normalized summary rating in the range 0 to 1. That is, the summary rating S for an option object 127 is:

$$S = \sum_{i=1}^{n} C_i R_i \quad \text{Eq. 8}$$

where $C_i$ is the normalized criteria weight of the $i^{th}$ criteria object 131 associated with the option object 127, $R_i$ is the normalized numeric rating of the $i_{th}$ rating object 129 is associated with the option object 127, and n is the number of criteria objects 131 overall.

Since the normalized summary rating is between 0 and 1, it is preferable to convert 915 the normalized summary rating to a whole number, since typical users are more facile with dealing with whole number assessments. In the preferred embodiment, a 10-point scale is used, and the normalized numeric rating is multiplying 10 to convert 913 the summary rating to this scale. In other embodiment, other scales, such as a 100-point scale may be used.

Finally, the option object 127 determines 917 the appropriate summary table image from its summary rating. The summary table image is determined as follows. First, a summary rating is determined for a hypothetical, top-of-poor option. The top-of-poor option has a rating, for each criterion object 131, at the top of the "Poor" column for the criterion object's option rating window 121. If a real option has a summary rating less than or equal to the top-of-poor summary rating, than it is in the "Poor" category. Assume four columns in an option rating window 121, and assume further that a top-of-poor option has a summary rating of 4 on a 10-point scale. The remainder of the scale, (here, 10−4=6) is taken, and divided evenly among the remaining columns (3, in this preferred embodiment, "Excellent," "Good," and "Pair"). Each of these categories then has a 2-point range (6/3=2). The mappings then are as follows for the summary ratings:

0–4=Poor
4–6=Fair
6–8=Good
8–10=Excellent.

The mapping result is used as the text label of the summary table image 505. This process accommodates the fact that the bottom of the scale may not be 0 (and is not in the default case), and consequently the "Poor" portion of the numeric scale is larger than any other part.

The foregoing description of the invention has described one embodiment of the invention using objects to store and hold the data associated with the options, criteria, ratings, and the like. In particular, the use of rating images, table images, and summary table images have been described as a preferred way of disassociating the visual representation of the objects from their underlying data. In other embodiments, the image type of objects may be eliminated, and the operations and data for representing and manipulating the images may be incorporated directly into the other objects.

In addition, the present invention may be implemented in a non-object oriented environment using conventional procedural languages. In this type of embodiment, the data representative of the options, criteria, ratings, and the like, would be stored in data structures such as arrays, linked lists, and the like, and the operations for determining ratings, summary ratings, and the like would be handled by individual procedures or functions executed according to a control program.

I claim:

1. A computer system providing decision analysis for providing evaluations of a plurality of user defined options with respect to a user defined criterion, comprising:

a user interface display including an ordered first plurality of category areas distributed along a first axis, and having a plurality of contiguous locations distributed along a second axis, each location along the second axis mapped to a rating within a selected range of numerical ratings, the category areas ordered such that the selected ranges form a numerical sequence, each category area capable of displaying options at selected locations along the second axis, the display of an option at a selected location within a category area indicative of a categorical evaluation of the option with respect to the criterion and a selected numeric rating; and a pointing device operable by a user to select any option displayed within the user interface display and to position the selected option at a location in a category area to establish a rating corresponding to the displayed location thereto.

2. The user interface display of claim 1, further comprising:

a second plurality of category areas, each one of the second plurality of category areas having a single location mapped to a selected numeric rating, the second plurality of category areas including:

a first category area representative of an affirmative evaluation of at least one selected option with respect to the criterion; and a second category area representative of a negative evaluation of at least one selected option with respect to the criterion.

3. The user interface display of claim 2, further comprising:

a third category area representative of an indeterminate evaluation of at least one selected option with respect to the criterion; and a fourth category area representative of an inapplicability of a criterion to at least one selected option.

4. The user interface display of claim 2, further comprising:

a first text entry field capable of accepting and displaying text data associated with a selected option in response to selection of the option by the pointing device.

5. The user interface display of claim 4, further comprising:

a menu including names of options displayed in the category areas, each name individually selectable with the pointing device and causing the display of text data associated with the named option in the first text entry field.

6. The user interface of claim 1, further comprising:
a data display field capable of displaying the rating of an option selected with the pointing device.

7. The user interface of claim 1, further comprising:
a rating scale disposed in a third axis parallel to the first axis, and having an ordered plurality of segments, each segment corresponding to a category area, and having a size in the third axis equal to a size of the corresponding category area along the first axis, each segment mapped to a selected range of numerical ratings equal to the selected range of numerical ratings mapped by the corresponding category area, each segment having a plurality of contiguous positions distributed along the third axis, each position along the third axis mapped to a rating within the selected range;

a rating slider movably disposable to a first position in a first segment on the rating scale with the pointing device for a first option;
the positioning of the rating slider at the first position causing the first option to be displayed within a first category area corresponding to the first segment, and at a first location in the first category area that is mapped to a same first numeric rating as a first numeric rating mapped to the first position of the rating slider; and
the positioning of a second option with the pointing device at a second location within a second category area causing the rating slider to be displayed in a second segment corresponding to the second category area and at a second position in the second segment area that is mapped to a same second numeric rating as a second numeric rating mapped to the second location.

8. The user interface of claim 1, wherein each option has a name, further comprising:
a display area displaying the names of any options overlapping with a selected option, the names selectable with the pointing device, the selection of a first name in the display area causing the display of a first option having the first name in front of, and overlapping, any second option the name of which is displayed in the display area.

9. The computer system of claim 1, further comprising:
a numeric scale including:
a user definable scale maximum;
a user definable scale minimum, the numeric scale forming the numerical sequence of selected ranges to which are mapped the locations of the category areas, the user interface display including a first category having a first location mapped to the scale maximum, and a second category having a second location mapped to the scale minimum; and
a user definable inversion flag that cause the first location to be mapped to the scale minimum and the second location to be mapped to the scale maximum.

10. The computer system of claim 9, wherein a rating R of an option at a location in a first category area is determined according to the equation:

$$R = S_{min} + \left( \frac{L + \left(\frac{V}{D}\right)}{N} * (S_{max} - S_{min}) \right)$$

where:
$S_{max}$ is the scale maximum;
$S_{min}$ is the scale minimum;
L is a number of category areas from the first category areas to and including a second category having a location mapped to the scale minimum;
N is the number of category areas;
D is a total distance along the second axis from a first end of a category area to a second end of a category area; and,
V is a distance of the option from an end of the category area nearest the scale minimum.

11. The user interface display of claim 1, further comprising:
a plurality of user definable category labels, each category label associated with and displayed substantially adjacent to a selected category area.

12. A computer system providing decision analysis for providing evaluations of a plurality of options with respect to at least one user defined criterion, comprising:
a user interface display including an ordered plurality of criteria weighting areas distributed along a first axis, each criteria weighting area mapped to a selected range of numerical weights, and having a plurality of contiguous locations distributed along a second axis, each location along the second axis mapped to a numerical criteria weight within the selected range, the criteria weighting areas ordered such that the selected ranges form a numerical sequence, each criteria weighting area capable of displaying criteria at selected locations along the second axis, the display of a criterion at a selected location within a criteria weighting area indicative of categorical evaluation of the criteria corresponding to a significance of the criteria in evaluating the options, the selected location mapped to a selected criteria weight; and
a pointing device operable by a user to select any criteria displayed within the user interface display and to position the selected criteria at a location in a criteria weighting area to establish a criteria weight therefor.

13. The user interface display of claim 12, further comprising:
a text entry field capable of accepting and displaying text data associated with a selected criteria in response to a selection of the criteria by the pointing device.

14. The user interface display of claim 13, further comprising:
a menu including names of criteria displayed in the criteria weighting areas, each criteria name individually selectable with the pointing device and causing the display of text data associated with the named criteria in the text entry field.

15. The user interface of claim 12, further comprising:
a data display field capable of displaying the criteria weight of a criteria selected with the pointing device.

16. The user interface of claim 12, further comprising:
a weighting scale disposed in a third axis parallel to the first axis, and having an ordered plurality of segments, each segment corresponding to a criteria weighting area, and having a size in the third axis equal to a size of the corresponding criteria weighting area along the first axis, each segment mapped to a selected range of numerical weightings equal to the selected range of numerical weightings mapped by the corresponding criteria weighting area, each segment having a plurality of contiguous positions distributed along the first axis, each position along the first axis mapped to a criteria weight within the selected range;
a rating slider movably disposable to a first position in a first segment on the weighting scale with the pointing device for a selected criteria;

the positioning of the rating slider at the first position causing a selected first criteria to be displayed within a first criteria weighting area corresponding to the first segment, and at a first location in the first criteria weighting area that is mapped to a same first numeric weight as a first numeric weight mapped to the first position of the rating slider; and the positioning of a selected second criteria with the pointing device at a second location within a second criteria weighting area causing the rating slider to be displayed in a second segment corresponding to the second criteria weighting area and at a second position in the second segment area that is mapped to a same second numeric weight as a second numeric weight mapped to the second location.

17. The user interface of claim 12, wherein each criteria has a name, further comprising:

a display area displaying the names of any criteria overlapping with a selected criteria, the names selectable with the pointing device, the selection of a first name in the display area causing the display of a first criteria having the first name in front of, and overlapping, any second criteria a name of which is displayed in the display area.

18. The computer system of claim 12, further comprising:
a numeric scale including:
 a user definable scale maximum; and
 a user definable scale minimum, the numeric scale forming the numerical sequence of selected ranges to which are mapped the locations of the criteria weighting areas, the user interface display including a first criteria having a first location mapped to the scale maximum, and a second criteria weighting area including a second location mapped to the scale minimum.

19. The computer system of claim 18, wherein a weighting R of a criteria at a location in a first criteria weighting area is equal to:

$$R = S_{min} + \left( \frac{L + \left(\frac{V}{D}\right)}{N} * (S_{max} - S_{min}) \right)$$

where:
$S_{max}$ is the scale maximum;
$S_{min}$ is the scale minimum;
L is a number of criteria weighting areas from the first criteria weighting area to and including a second criteria weighting area having a location mapped to the scale minimum;
N is the number of criteria weighting areas;
D is a total distance along the second axis from a first end of a criteria weighting area to a second end of a criteria weighting area; and
V is a distance of the criteria from an end of the criteria weighting area nearest the scale minimum.

20. A computer system providing decision analysis for providing evaluations of a plurality of options with respect to at least one user defined criterion, the computer system comprising:

a decision table display window including:
 a first plurality of user defined options, each option displayed in a separate first cell defining a row, the options displayed in an ordered sequence;
 a second plurality of user defined criteria, each criteria displayed in a separate second cell defining a column, each criteria associated with a criteria weight;
 a rating matrix including a third plurality of rating cells, each rating cell displayed at an intersection of a row defined by a first cell and a column defined by a second cell, each rating cell displaying a rating label descriptive of a categorical evaluation of the option named in the first cell with respect to the criteria named in the second cell, each rating cell associated with a numeric rating; and
 a plurality of summary rating cells, each summary rating cell associated with an option and displayed in a same row as the option, each summary rating cell displaying summary rating label descriptive of an overall evaluation of the associated option with respect to the criteria, each summary rating cell associated with a numeric summary rating that is a function of the numeric rating of each rating cell in the same row and the criteria weight of the criteria in the column of each rating cell, the ordered sequence of the options determined by an ordering of the summary ratings and selected rating labels.

21. The user interface of claim 20, further comprising:
a user controllable pointing device for selecting any option cell, criteria cell, or rating cell;
a rating scale having plurality of segments, each segment corresponding to a categorical evaluation, each segment mapped to a range of numeric ratings, each segment having a plurality of contiguous positions, each position mapped to a rating within the mapped range; and
a rating slider movably disposable with the pointing device to a user selectable first position in a selected segment on the rating scale for a user selected rating cell, the positioning of the rating slider at the first position causing the selected rating cell to display the categorical evaluation corresponding to the selected segment, to associate with the rating cell the rating mapped to the first position, causing a first summary rating in a same row as the selected rating cell to be predetermined.

22. The computer system of claim 20, further comprising:
a user interface display including an ordered first plurality of category areas distributed along a first axis, and having a plurality of contiguous locations distributed along a second axis, each location along the second axis mapped to a rating within a selected range of numerical ratings, the category areas ordered such that the selected ranges form a numerical sequence, each category area capable of displaying options at selected locations along the second axis, the display of an option at a selected location within a category area indicative of a categorical evaluation of the option with respect to the criterion and a selected numeric rating; and
a pointing device operable by a user to select any option displayed within the user interface display and to position the selected option at a location in a category area to establish a rating corresponding to the displayed location thereto, wherein the categorical evaluation of an option with respect to a criterion is determined by the the user positioning the option at a selected location within a category area indicative of the categorical evaluation, and the numeric rating is determined according to the rating mapped to the location.

23. The computer system of claim 20, further comprising:
a user interface display including an ordered plurality of criteria weighting areas distributed along a first axis, each criteria weighting area mapped to a selected range of numerical weights, and having a plurality of contiguous locations distributed along a second axis, each location along the second axis mapped to a numerical criteria weight within the selected range, the criteria weighting areas ordered such that the selected ranges form a numerical sequence, each criteria weighting area capable of displaying criteria at selected locations along the second axis, the display of a criteria at a selected location within a criteria weighting area indicative of categorical evaluation of the criteria corresponding to a significance of the criteria in evaluating the options, the selected location mapped to a selected criteria weight; and a pointing device operable by a user to select any criteria displayed within the user interface display and to position the selected criteria at a location in a criteria weighting area to establish a criteria weight therefor, wherein the criteria weight of a selected criteria is determined by the user by positioning the selected criteria at a user selected location within a criteria weighting area, the selected location mapped to a criteria weight.

24. The computer system of claim 20, wherein:

each rating cell is associated with a rating object that includes methods that determine the numeric rating and the rating label of the rating cell;

each option is stored as a option object having an attribute for storing the option name, and at least one method for determining the summary rating associated with the option object; and each criterion is stored as a criteria object having an attribute for storing the criterion name and at least one method for determining the criteria weight associated with the criteria object.

25. The computer system of claim 24, further comprising:

a table image object associated with each rating cell and storing as a first attribute the rating label of the associated rating cell, and storing as a second attribute a position of the table image object; and a summary table image object associated with each summary rating cell and storing as a first attribute the summary rating label of the associated summary rating cell, and storing as a second attribute a position of the summary table image.

26. A computer implemented method of performing a decision analysis, comprising the steps of:

accepting a first set of user inputs defining at least one option;

accepting a second set of user inputs defining at least one criterion;

accepting a third set of user inputs weighting a user selected criterion with a criteria weight by:

displaying a plurality of images, each image representative of a criterion;

accepting a fifth user input specifying a position for an image representing the user selected criterion;

positioning the image at the position; and, determining the criteria weight of the user selected criteria as a function of the position;

accepting a fourth user input rating a user selected option with respect to a user selected criterion to establish an option rating, the option rating associated with the user selected option and the user selected criterion;

determining, for each option, a summary rating as a function of the option rating associated with the option, each summary rating associated with an option;

ordering the summary ratings; and, displaying the options in an ordere sequence determined by the ordering of the summary ratings.

27. The method of claim 26, wherein the step of accepting a fifth user input rating a user selected option with respect to a user selected criterion to establish an option rating further comprises the steps of:

displaying a plurality of images, each image representative of an option;

accepting a sixth user input specifying a position for an image representing the user selected option;

positioning the image at the position; and determining the option rating of the option being a function of the position.

28. The method of claim 26, further comprising:

displaying a plurality of image representative of options, each image responsive to user selection thereof;

accepting a sixth user input selecting one of the plurality of images;

determining which images, if any, overlap the selected image;

displaying for each image that overlaps the selected image a name of the option represented by the image; and displaying the selected image in front of any images that overlap it.

29. The method of claim 26, further comprising the steps of:

displaying a plurality of images representative of options, each image responsive to user selection thereof, a subset of the images displayed overlapping;

displaying, for each image of the subset of images, a name of the option represented by the image; and accepting a sixth user input selecting one of the plurality of displayed names; and, displaying the image representing the option with the selected name in front of any images that overlap it.

* * * * *